United States Patent
Zhang et al.

(10) Patent No.: US 8,826,106 B2
(45) Date of Patent: Sep. 2, 2014

(54) LOW BANDWIDTH PHY FOR WLAN

(75) Inventors: Hongyuan Zhang, Fremont, CA (US); Raja Banerjea, Sunnyvale, CA (US); Sudhir Srinivasa, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 38 days.

(21) Appl. No.: 13/494,505

(22) Filed: Jun. 12, 2012

(65) Prior Publication Data

US 2012/0324315 A1 Dec. 20, 2012

Related U.S. Application Data

(60) Provisional application No. 61/552,631, filed on Oct. 28, 2011, provisional application No. 61/550,321, filed on Oct. 21, 2011, provisional application No. 61/537,169, filed on Sep. 21, 2011, provisional application No. 61/534,641, filed on Sep. 14, 2011, provisional application No. 61/531,548, filed on Sep. 6, 2011, provisional application No. 61/524,231, filed on Aug. 16, 2011, provisional application No. 61/523,799, filed on Aug. 15, 2011, provisional application No. 61/523,014, filed on Aug. 12, 2011, provisional application No. 61/514,164, filed on Aug. 2, 2011, provisional application No. 61/513,452, filed on Jul. 29, 2011, provisional application No. 61/497,274, filed on Jun. 15, 2011.

(51) Int. Cl.
*G06F 11/00* (2006.01)
*H03M 13/00* (2006.01)
*H04L 1/00* (2006.01)
*H04L 7/04* (2006.01)

(52) U.S. Cl.
CPC .............. *H04L 1/0043* (2013.01); *H04L 1/0057* (2013.01); *H04L 1/0061* (2013.01); *H04L 7/048* (2013.01)
USPC ........................... 714/776; 714/707; 714/780

(58) Field of Classification Search
None
See application file for complete search history.

(56) References Cited

U.S. PATENT DOCUMENTS 6,397,368 B1 * 5/2002 Yonge et al. ................... 714/792
6,553,534 B2 * 4/2003 Yonge et al. ................... 714/774

(Continued)

FOREIGN PATENT DOCUMENTS

WO WO-2008/004155 A2 3/2008

OTHER PUBLICATIONS

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

(Continued)

*Primary Examiner* — Daniel McMahon

(57) ABSTRACT

A method includes generating first and second data units corresponding to first and second PHY modes, respectively. Generating the first data unit includes FEC encoding first information bits, mapping the FEC-encoded bits to first constellation symbols, and generating first OFDM symbols to include the first constellation symbols. The first OFDM symbols utilize a first tone spacing, and include a first number of non-zero tones collectively spanning a first bandwidth. Generating the second data unit includes FEC encoding second information bits, block encoding the FEC-encoded bits, mapping the block-encoded bits to second constellation symbols, and generating second OFDM symbols to include the second constellation symbols. The second OFDM symbols utilize the first tone spacing, and include a second number of non-zero tones collectively spanning a second bandwidth less than the first bandwidth. The second number of non-zero tones is less than the first number of non-zero tones.

28 Claims, 23 Drawing Sheets

(56) References Cited

U.S. PATENT DOCUMENTS

| | | | |
|---|---|---|---|
| 6,598,200 B1 * | 7/2003 | Greenwood et al. | 714/774 |
| 6,975,837 B1 | 12/2005 | Santoru | |
| 8,077,696 B2 | 12/2011 | Izumi et al. | |
| 8,165,185 B2 * | 4/2012 | Zhang et al. | 375/135 |
| 8,175,119 B2 | 5/2012 | Zhang et al. | |
| 8,289,869 B2 | 10/2012 | Sawai | |
| 8,340,004 B2 * | 12/2012 | Bachu et al. | 370/294 |
| 8,351,521 B2 * | 1/2013 | Lakkis | 375/260 |
| 8,379,757 B1 * | 2/2013 | Zhang et al. | 375/295 |
| 8,644,128 B2 | 2/2014 | Zhang et al. | |
| 8,665,974 B2 | 3/2014 | Zhang et al. | |
| 2003/0193889 A1 * | 10/2003 | Jacobsen | 370/208 |
| 2005/0034053 A1 * | 2/2005 | Jacobsen et al. | 714/800 |
| 2005/0204258 A1 * | 9/2005 | Hansen et al. | 714/755 |
| 2009/0196163 A1 * | 8/2009 | Du | 370/204 |
| 2010/0014603 A1 | 1/2010 | Palanki et al. | |
| 2010/0054371 A1 | 3/2010 | Namgoong et al. | |
| 2010/0111220 A1 | 5/2010 | Rouquette-Leveil et al. | |
| 2011/0026639 A1 | 2/2011 | Rouquette-Leveil et al. | |
| 2011/0051845 A1 | 3/2011 | Schmidl et al. | |
| 2011/0096797 A1 | 4/2011 | Zhang et al. | |

OTHER PUBLICATIONS

Park, "Proposed Specification Framework for TGah", *The Institute of Electrical and Electronics Engineers*, doc. No. IEEE 802.11-11/1137r6, (Mar. 2012).

IEEE Std 802.11b-1999/Cor 1-2001 (Corrigendum to IEEE Std 802.11b-1999) "IEEE Standard For Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

Partial International Search Report for PCT/US2012/042027, mailed Aug. 27, 2012.

Vermani et al. "Preamble Format for 1 MHz," *The Institute of Electrical and Electronics Engineers*, doc. No. IEEE 802.11-11/1482r2 (Nov. 2011).

Zhang et al., "1 MHz Waveform in Wider BW ", *The Institute of Electrical and Electronics Engineers*, doc. No. IEEE 802.11-12/0309r1 (Mar. 2012).

Vermani et al. "Spec Framework Text for PHY Numerology," *The Institute of Electrical and Electronics Engineers*, doc. No. IEEE 802.11-11/1311r0 (Sep. 2011).

Zhang et al., "11ah Data Transmission Flow," *The Institute of Electrical and Electronics Engineers*, doc. No. IEEE 802.11-11/1484r, (Nov. 2011).

International Search Report and Written Opinion from corresponding International Application No. PCT/US2012/042027, mailed Mar. 27, 2013.

Notice of Allowance in U.S. Appl. No. 13/494,527 dated Dec. 13, 2013.

Office Action in U.S. Appl. No. 13/494,515 dated Mar. 17, 2014.

\* cited by examiner

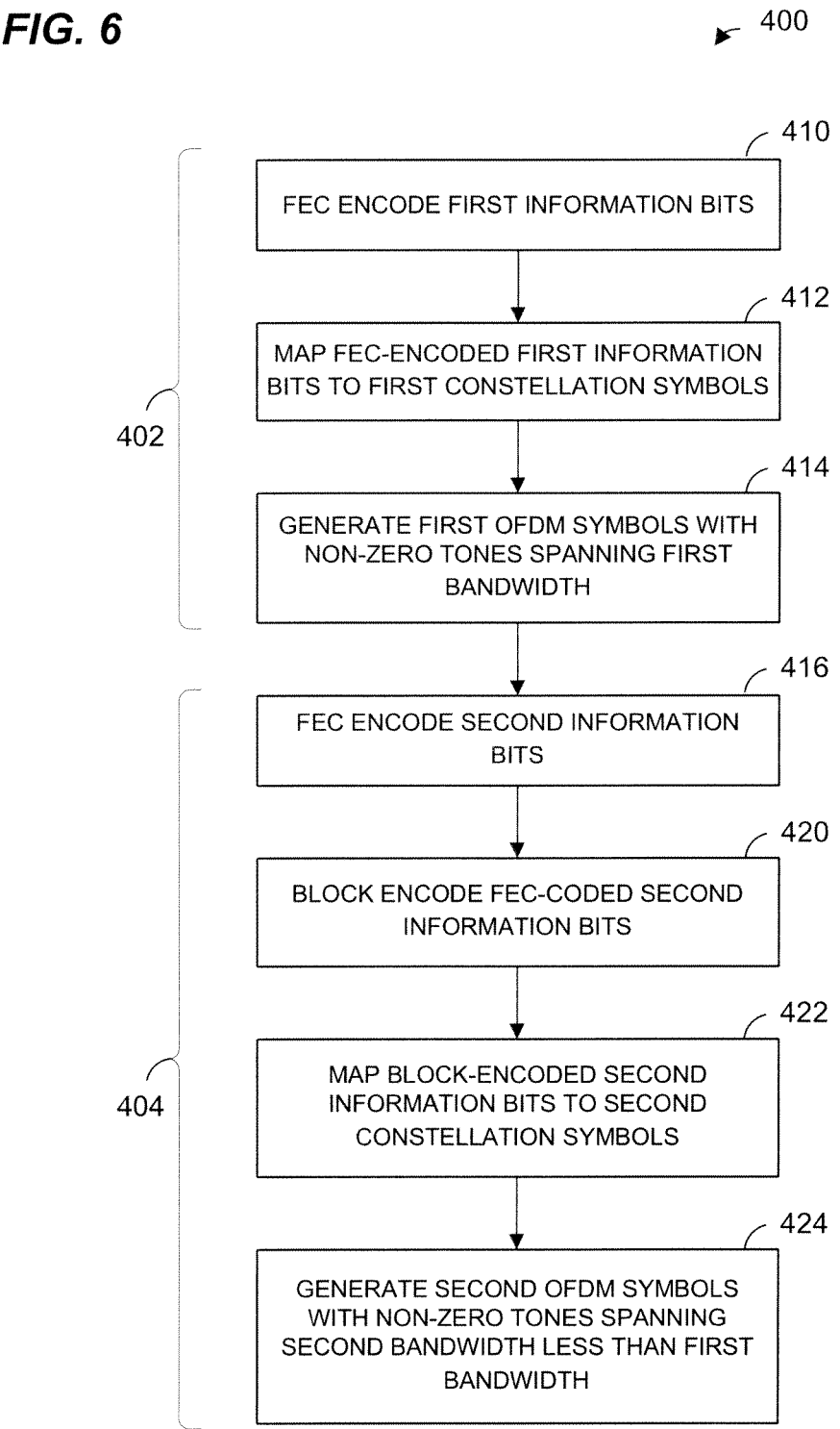

LOW BANDWIDTH PHY FOR WLAN

CROSS-REFERENCES TO RELATED APPLICATIONS

This disclosure claims the benefit of the following U.S. Provisional Patent Applications:

U.S. Provisional Patent Application No. 61/497,274, entitled "11ah OFDM Low Bandwidth PHY," filed on Jun. 15, 2011;

U.S. Provisional Patent Application No. 61/513,452, entitled "11ah OFDM Low Bandwidth PHY," filed on Jul. 29, 2011;

U.S. Provisional Patent Application No. 61/514,164, entitled "11ah OFDM Low Bandwidth PHY," filed on Aug. 2, 2011;

U.S. Provisional Patent Application No. 61/523,014, entitled "11ah OFDM Low Bandwidth PHY." filed on Aug. 12, 2011;

U.S. Provisional Patent Application No. 61/523,799, "11ah OFDM Low Bandwidth PHY," filed on Aug. 15, 2011;

U.S. Provisional Patent Application No. 61/524,231, entitled "11ah OFDM Low Bandwidth PHY," filed on Aug. 16, 2011;

U.S. Provisional Patent Application No. 61/531,548, entitled "11ah OFDM Low Bandwidth PHY," filed on Sep. 6, 2011;

U.S. Provisional Patent Application No. 61/534,641, entitled "11ah OFDM Low Bandwidth PHY," filed on Sep. 14, 2011;

U.S. Provisional Patent Application No. 61/537,169, entitled "11ah OFDM Low Bandwidth PHY," filed on Sep. 21, 2011;

U.S. Provisional Patent Application No. 61/550,321, entitled "11ah OFDM Low Bandwidth PHY," filed on Oct. 21, 2011; and U.S. Provisional Patent Application No. 61/552,631, entitled "11ah OFDM Low Bandwidth PHY," filed on Oct. 28, 2011.

The disclosures of all of the above-referenced patent applications are hereby incorporated by reference herein in their entireties.

The present application is related to U.S. patent application Ser. Nos. 13/494,515 and 13/494,527, both entitled "Low Bandwidth PHY for WLAN," both filed on the same day as the present application, and both hereby incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of tiling, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards. IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method includes generating a first data unit corresponding to a first physical layer (PHY) mode. Generating the first data unit includes forward error correction (FEC) encoding a first plurality of information bits, mapping the FEC-encoded first plurality of information bits to a first plurality of constellation symbols, and generating a first plurality of orthogonal frequency division multiplexing (OFDIVI) symbols to include the first plurality of constellation symbols. The first plurality of OFDM symbols (i) utilizes a first tone spacing, and (ii) includes a first number of non-zero tones collectively spanning a first bandwidth. The method also includes generating a second data unit corresponding to a second PHY mode. Generating the second data unit includes FEC encoding a second plurality of information bits, block encoding the FEC-encoded second plurality of information bits, mapping the block-encoded second plurality of information bits to a second plurality of constellation symbols, and generating a second plurality of OFDM symbols to include the second plurality of constellation symbols. The second plurality of OFDM symbols (i) utilizes the first tone spacing, and (ii) includes a second number of non-zero tones collectively spanning a second bandwidth. The second number of non-zero tones is less than the first number of non-zero tones, and the second bandwidth is less than the first bandwidth.

In another embodiment, an apparatus includes a network interface configured to generate a first data unit corresponding to a first PHY mode. The network interface is configured to generate the first data unit at least in part by FEC encoding a first plurality of information bits, mapping the FEC-encoded first plurality of information bits to a first plurality of constellation symbols, and generating a first plurality of OFDM symbols to include the first plurality of constellation symbols. The first plurality of OFDM symbols (i) utilizes a first tone spacing and (ii) includes a first number of non-zero tones collectively spanning a first bandwidth. The network interface is also configured to generate a second data unit corresponding to a second PHY mode. The network interface is configured to generate the second data unit at least in part by FEC encoding a second plurality of information bits, block encoding the FEC-encoded second plurality of information bits, mapping the block-encoded second plurality of information bits to a second plurality of constellation symbols, and generating a second plurality of OFDM symbols to include the second plurality of constellation symbols. The second plurality of OFDM symbols (i) utilizes the first tone spacing and (ii) includes a second number of non-zero tones collectively spanning a second bandwidth. The second number of non-zero tones is less than the first number of non-zero tones, and the second bandwidth is less than the first bandwidth.

In another embodiment, a method includes generating a first data unit corresponding to a first PHY mode. Generating the first data unit includes FEC encoding a first plurality of information bits according to a first modulation and coding scheme (MCS) selected from a plurality of MCSs. The plurality of MCSs corresponds to a plurality of relative throughput levels. A portion of the first plurality of information bits corresponds to a data portion of the first data unit, and another portion of the first plurality of information bits corresponds to a signal field of a preamble of the first data unit. Generating the first data unit also includes mapping the FEC-encoded first plurality of information bits to a first plurality of constellation symbols according to the first MCS, and generating a first plurality of OFDM symbols to include the first plurality of constellation symbols. The first plurality of OFDM symbols (i) utilizes a first tone spacing and (ii) includes a first number of non-zero tones collectively spanning a first bandwidth. The method also includes generating a second data unit corresponding to a second PHY mode. Generating the second data unit includes FEC encoding a second plurality of information bits according to a second MCS. The second MCS corresponds to a relative throughput level equal to or less than a lowest relative throughput level of the plurality of relative throughput levels. A portion of the second plurality of information bits corresponds to a data portion of the second data unit, and another portion of the second plurality of information bits corresponds to a signal field of a preamble of the second data unit. Generating the second data unit also includes partitioning the FEC-encoded second plurality of information bits into blocks of n information bits, repeating each block of n information bits two times to generate 2*n information bits, mapping the partitioned and repeated second plurality of information bits to a second plurality of constellation symbols according to the second MCS, and generating a second plurality of OFDM symbols to include the second plurality of constellation symbols. The second plurality of OFDM symbols (i) utilizes the first tone spacing and (ii) includes a second number of non-zero tones collectively spanning a second bandwidth. The second number of non-zero tones is no more than half the first number of non-zero tones, and the second bandwidth is no more than half the first bandwidth.

In another embodiment, an apparatus includes a network interface configured to generate a first data unit corresponding to a first PHY mode. The network interface is configured to generate the first data unit at least in part by FEC encoding a first plurality of information bits according to a first MCS selected from a plurality of MCSs. The plurality of MCSs corresponds to a plurality of relative throughput levels. A portion of the first plurality of information bits corresponds to a data portion of the first data unit, and another portion of the first plurality of information bits corresponds to a signal field of a preamble of the first data unit. The network interface is further configured to generate the first data unit at least in part by mapping the FEC-encoded first plurality of information bits to a first plurality of constellation symbols according to the first MCS, and generating a first plurality of OFDM symbols to include the first plurality of constellation symbols. The first plurality of OFDM symbols (i) utilizes a first tone spacing and (ii) includes a first number of non-zero tones collectively spanning a first bandwidth. The network interface is further configured to generate a second data unit corresponding to a second PHY mode. The network interface is configured to generate the second data unit at least in part by FEC encoding a second plurality of information bits according to a second MCS. The second MCS corresponds to a relative throughput level equal to or less than a lowest relative throughput level of the plurality of relative throughput levels. A portion of the second plurality of information bits corresponds to a data portion of the second data unit, and another portion of the second plurality of information bits corresponds to a signal field of a preamble of the second data unit. The network interface is further configured to generate the second data unit at least in part by partitioning the FEC-encoded second plurality of information bits into blocks of n information bits, repeating each block of n information bits two times to generate 2*n information bits, mapping the partitioned and repeated second plurality of information bits to a second plurality of constellation symbols according to the second MCS, and generating a second plurality of OFDM symbols to include the second plurality of constellation symbols. The second plurality of OFDM symbols (i) utilizes the first tone spacing and (ii) includes a second number of non-zero tones collectively spanning a second bandwidth. The second number of non-zero tones is no more than half the first number of non-zero tones, and the second bandwidth is no more than half the first bandwidth.

BRIEF DESCRIPTION OF THE DRAWINGS

FIG. 6 is a flow diagram of an example method for generating first and second data units corresponding to first and second PHY modes, respectively, according to an embodiment.

Like reference symbols in the various drawings indicate like elements.

DETAILED DESCRIPTION

Figure 1:
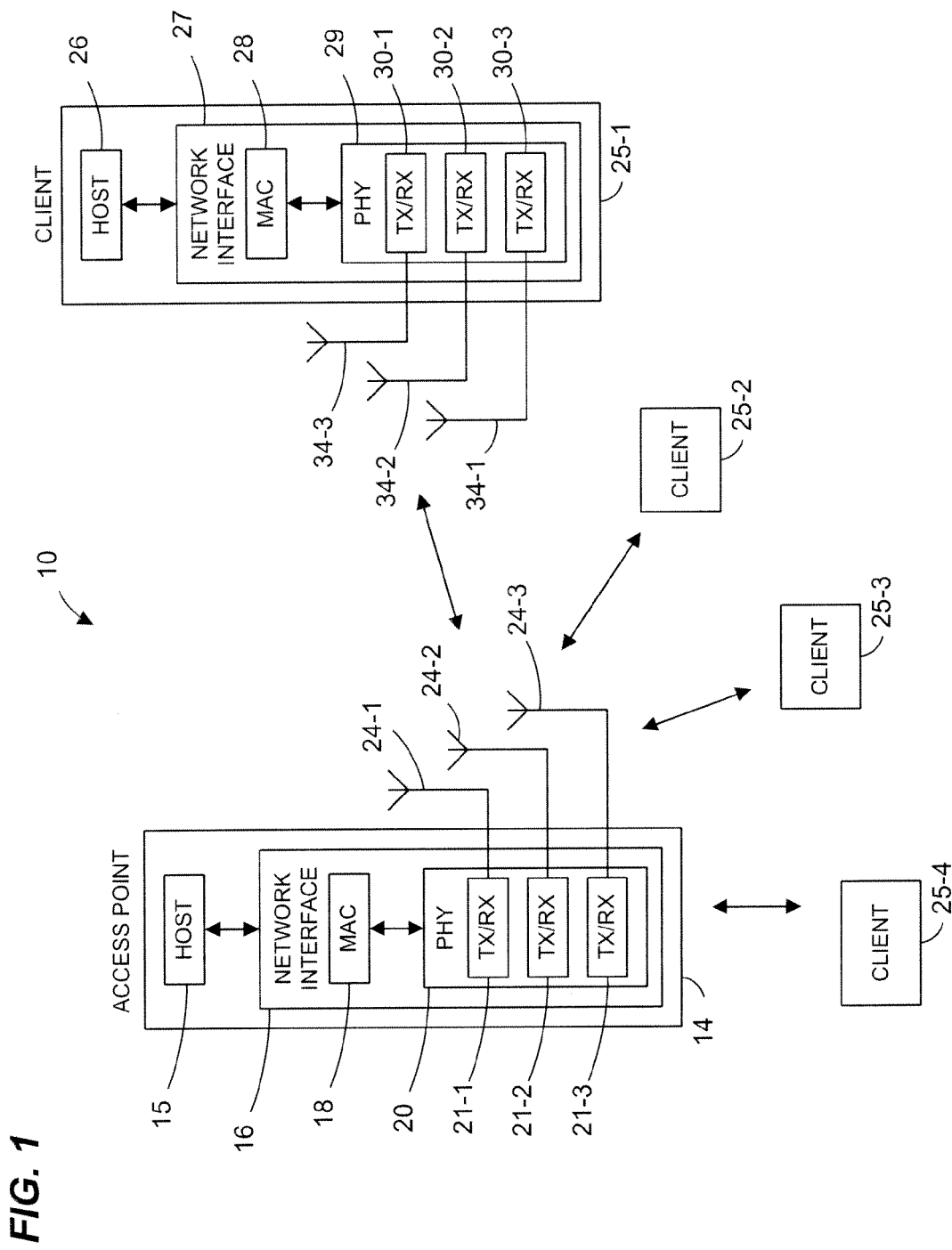
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g. IEEE 802.11a, IEEE 802.11n, and/or IEEE 802.11ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time.

In addition to this "normal mode" specified by the long range communication protocol, in some embodiments, the long range communication protocol also specifies a "low bandwidth mode" with a reduced bandwidth and data rate compared to the lowest bandwidth and data rate specified for the normal mode. Because of the lower data rate, the low bandwidth mode further extends communication range and generally improves receiver sensitivity. Data units corresponding to the low bandwidth mode are generated utilizing the same clock rate as data units corresponding to the normal mode (e.g., are down-clocked by the same ratio used for normal mode data units). For example, orthogonal frequency division multiplexing (OFDM) symbols of normal mode and low bandwidth mode data units both have the same subcarrier/tone spacing and OFDM symbol duration, in an embodiment. In some embodiments, the normal mode and/or low bandwidth mode include multiple PHY sub-modes. In one embodiment, for example, the normal mode includes a first sub-mode corresponding to 2 MHz data units, a second sub-mode corresponding to 4 MHz data units, etc., and the low bandwidth mode corresponds to only 1 MHz data units. In another embodiment, the low bandwidth mode likewise includes multiple sub-modes corresponding to data units having different bandwidths (e.g., 1 MHz, 0.5 MHz, etc.).

The function of the low bandwidth mode may depend on the region in which the mode is utilized. For example, in one embodiment of an IEEE 802.11ah system in the United States, where a relatively large amount of spectrum is available in sub-1 GHz frequencies, normal mode communications utilize channels having at least a minimum bandwidth (e.g., 2 MHz, or 2.5 MHz, etc.), and the low bandwidth mode serves as a "control mode" having an even smaller bandwidth (e.g., 1 MHz, or 10.25 MHz, etc.). In an embodiment, the AP uses the control mode for signal beacon or association procedures, and/or for transmit beamforming training operations, for example. As another example, in one embodiment of a communication system in which less spectrum is available in sub-1 GHz frequencies (e.g., Europe or Japan), the low bandwidth mode serves as an extension of the normal mode rather than a control mode.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY)

processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g. 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between short range and long range modes of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between short range and long range modes of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In still other embodiments, the client station 25-1 is a dual mode device capable of operating in different regions with different corresponding PHY modes. For example, in one such embodiment, the client station 25-1 is configured to utilize the normal mode PHY when operating in a first region, and to utilize the low bandwidth mode PHY when operating in a second region (e.g., a region with less available spectrum). In an embodiment, the client station 25-1 can switch between normal and low bandwidth modes in the different regions by switching between low bandwidth mode and normal mode baseband signal processing of the transmitter and receiver, and switching digital and analog filters to meet the requirements applicable to each mode (e.g., spectral mask requirements at the transmitter, adjacent channel interference requirements at the receiver, etc.). Hardware settings such as clock rate, however, are unchanged when switching between low bandwidth mode and normal mode, in an embodiment.

In one example embodiment, client station 25-1 is a dual mode device that utilizes a normal mode PHY in the U.S. (e.g., for 2 MHz and wider channels) and a low bandwidth mode in Europe and/or Japan (e.g., for 1 MHz channels). The same clock rate is used globally, in this embodiment, with different inverse discrete Fourier transform (IDFT) sizes being utilized to generate signals of different bandwidths (e.g., a 64-point or larger IDFT for the 2 MHz or wider bandwidth U.S. channels, and a 32-point IDFT for the 1 MHz Europe/Japan channels). In some of these embodiments, the low bandwidth mode is also used for control PHY in the U.S.

In another example embodiment, client station 25-1 is a dual mode device that in the U.S. utilizes a normal mode PHY (e.g., for 2 MHz and wider channels) and a low bandwidth mode PHY (e.g., for control mode signals having a 1 MHz bandwidth), and in Europe and/or Japan utilizes only the low bandwidth mode PHY (e.g., for 1 MHz channels). The same clock rate is used globally, in this embodiment, with different IDFT sizes being used to generate signals of different bandwidths (e.g., a 64-point or larger IDFT for the 2 MHz or wider bandwidth U.S. channels, and a 32-point IDFT for both the 1 MHz U.S. control mode signals and the 1 MHz Europe/Japan channels).

In some embodiments, devices such as client station 25-1 use the same size IDFT (at a constant clock rate) whether generating a smallest-bandwidth normal mode data unit or a low bandwidth mode data unit. For example, in one embodiment, a 64-point IDFT is used to generate both a 2 MHz normal mode data unit and a 1 MHz low bandwidth mode data unit, with the appropriate tones being zeroed out in the latter case. In some scenarios for these embodiments, filters need not be changed on the fly when changing between PHY modes, while still meeting the spectral mask requirements for the wider (e.g., 2 MHz) channel. In other scenarios, a transmitted low bandwidth mode signal is required to meet a tighter, lower bandwidth spectral mask even if transmitted using an IDFT size corresponding to a wider bandwidth.

Figure 2:
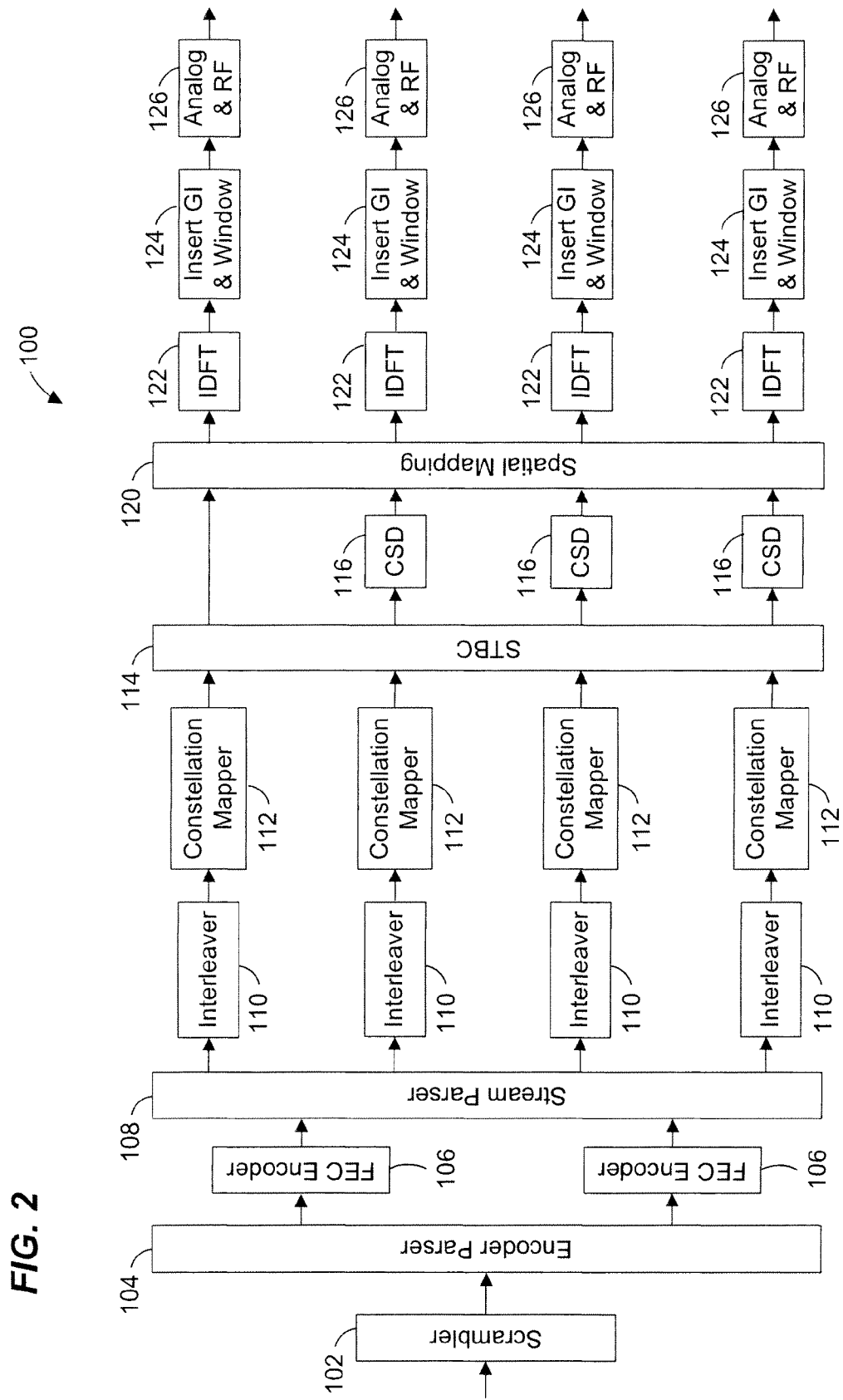
FIG. 2 is a block diagram of a transmit portion of an example physical layer (PHY) processing unit for generating normal mode data units, according to an embodiment.

FIG. 2 is a block diagram of a transmit portion of an example PHY processing unit 100 for generating normal mode data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more FEC encoders 106.

While two FEC encoders 106 are shown in FIG. 2, different numbers of FEC encoders are included, and/or different numbers of FEC encoders operate in parallel, in various other embodiments and/or scenarios. For example, according to one embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/symbols. In one embodiment, the stream parser 108 operates according to the IEEE 802.11n communication protocol, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 106 (whether BCC or LDPC), consecutive blocks of s coded bits are assigned to different spatial streams in a round robin fashion, in an embodiment. In some embodiments where the set of FEC encoders 106 includes two or more BCC encoders, the outputs of the individual FEC encoders 106 are used in an alternating fashion for each round-robin cycle, i.e., initially S bits from the first FEC encoder 106 are fed into $N_{SS}$ spatial streams, then S bits from the second FEC encoder 106 are fed into the $N_{SS}$ spatial streams, and so on, where:

$$S = N_{SS} \times s \quad \text{Equation 2}$$

Corresponding to each of the $N_{SS}$ spatial streams, an interleaver 110 interleaves bits of the spatial stream (i.e. changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length $\log_2(M)$ into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, a space-time block coding (STBC) unit 114 receives the constellation points corresponding to the one or more spatial streams and spreads the spatial streams to a number ($N_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted.

A spatial mapping unit 120 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping): 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. Outputs of the IDFT units 122 are provided to GI insertion and windowing units 124 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 124 are provided to analog and radio frequency (RF) units 126 that convert the signals to analog signals and upconvert the signals to RF frequencies for transmission. The signals are transmitted in a 2 MHz, a 4 MHz, an 8 MHz, or a 16 MHz bandwidth channel (e.g., corresponding to a 64-, 128-, 256-, or 512-point IDFT at unit 122, respectively, and utilizing a clock rate that is constant regardless of IDFT size), in various embodiments and/or scenarios. In other embodiments, other suitable channel bandwidths (and/or IDFT sizes) are utilized. Long range data units corresponding to the normal mode are discussed in more detail in U.S. patent application Ser. No. 13/359,336, filed on Jan. 6, 2012 and entitled "Physical Layer Frame Format for Long Range WLAN." which is hereby incorporated by reference herein in its entirety.

Low bandwidth mode communications are generally more robust than normal mode communications, having a sensitivity gain that supports extended range communications. For example, in an embodiment in which the normal mode utilizes a 64-point IDFT (e.g., for a 2 MHz bandwidth signal) to generate normal mode data units, and in which the low bandwidth mode utilizes a 32-point IDFT (e.g., for a 1 MHz bandwidth signal) to generate low bandwidth mode data units, the low bandwidth mode provides approximately a 3 dB sensitivity gain. As another example, in an embodiment in which the normal mode utilizes a 64-point IDFT (e.g., for a 2 MHz bandwidth signal) to generate normal mode data units, and in which the low bandwidth mode utilizes a 16-point IDFT (e.g., for a 0.5 MHz bandwidth signal) to generate low bandwidth mode data units, the low bandwidth mode provides approximately a 6 dB sensitivity gain. Moreover, in some embodiments, the low bandwidth mode introduces redundancy or repetition of bits into at least some fields of the data unit to further reduce the data rate. For example, in various embodiments and/or scenarios, the low bandwidth mode introduces redundancy into the data portion and/or the signal field of a low bandwidth mode data unit according to one or more repetition and coding schemes described below. In an embodiment where the low bandwidth mode includes a 2× repetition of bits, for example, a further 3 dB sensitivity gain may be obtained. Still further, in some embodiments, the low bandwidth mode improves sensitivity by generating OFDM symbols in accordance with the lowest data rate MCS of the normal mode, or in accordance with an MCS lower than the lowest data rate MCS of the normal mode. As an example, in an embodiment, data units in normal mode are generated according to a particular MCS selected from a set of MCSs, such as MCS0 (binary phase shift keying (BPSK) modulation and coding rate of 1/2) to MCS9 (quadrature amplitude modulation (QAM) and coding rate of 5/6), with higher order MCSs corresponding to higher data rates. In one such embodiment, the low bandwidth mode data units are generated using modulation and coding as defined by MCS0. In an alternative embodiment, MCS0 is reserved for low bandwidth mode data units only, and cannot be used for normal mode data units.

Figure 3:
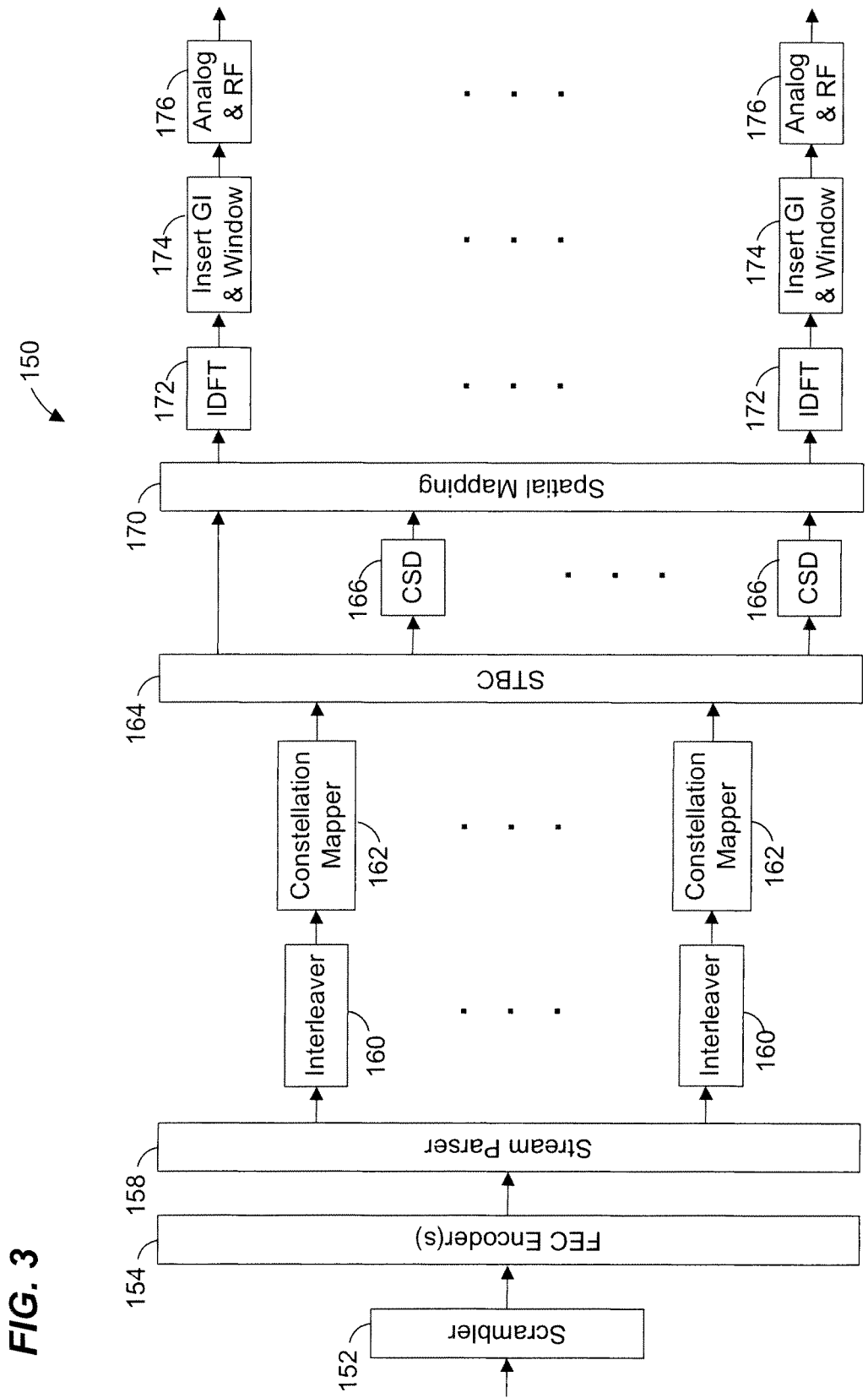
FIG. 3 is a block diagram of a transmit portion of an example PHY processing unit for generating low bandwidth mode data units, according to an embodiment.
Figure 4:
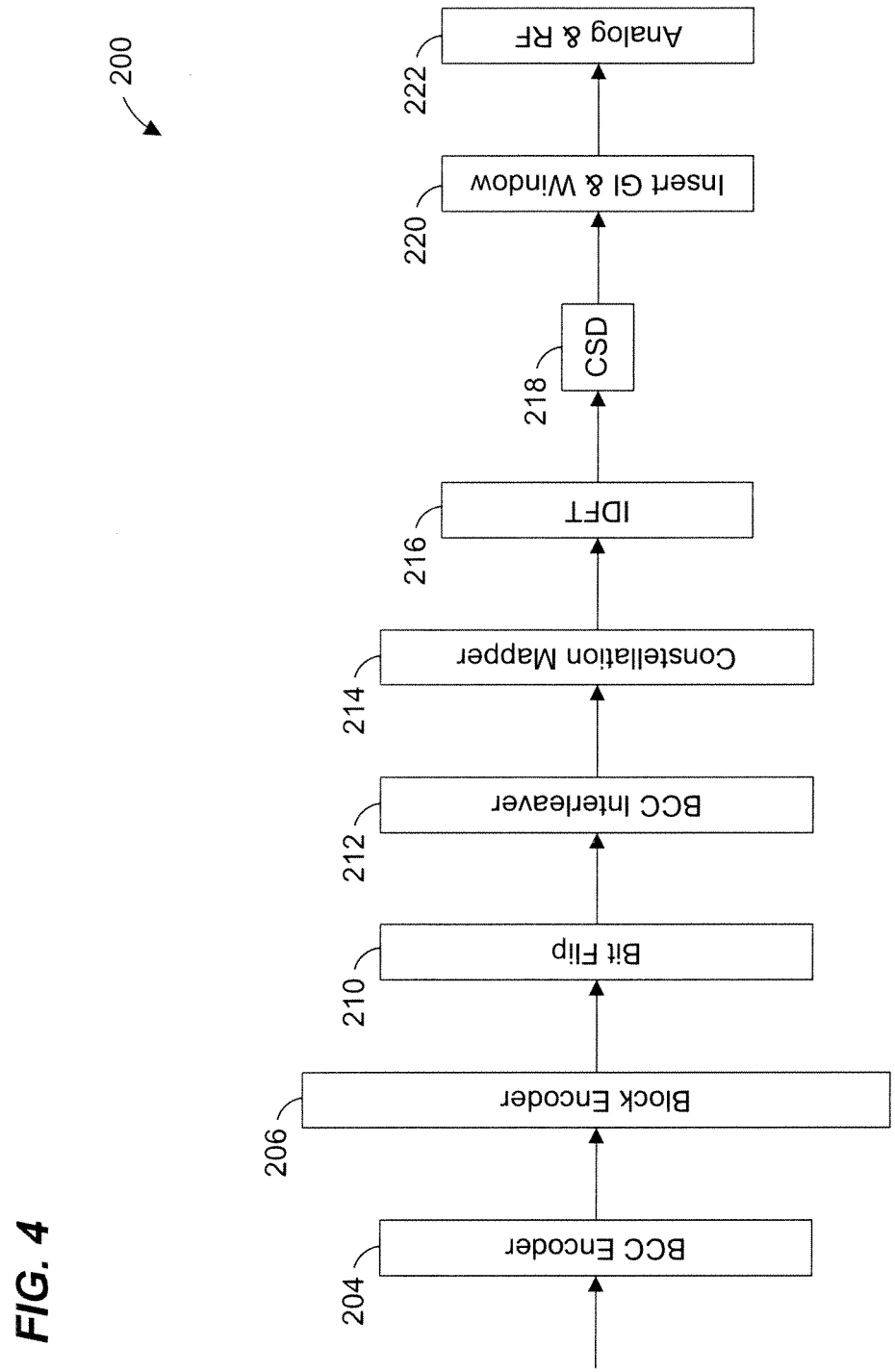
FIG. 4 is a block diagram of a transmit portion of another example PHY processing unit for generating low bandwidth mode data units, according to an embodiment.
Figure 5:
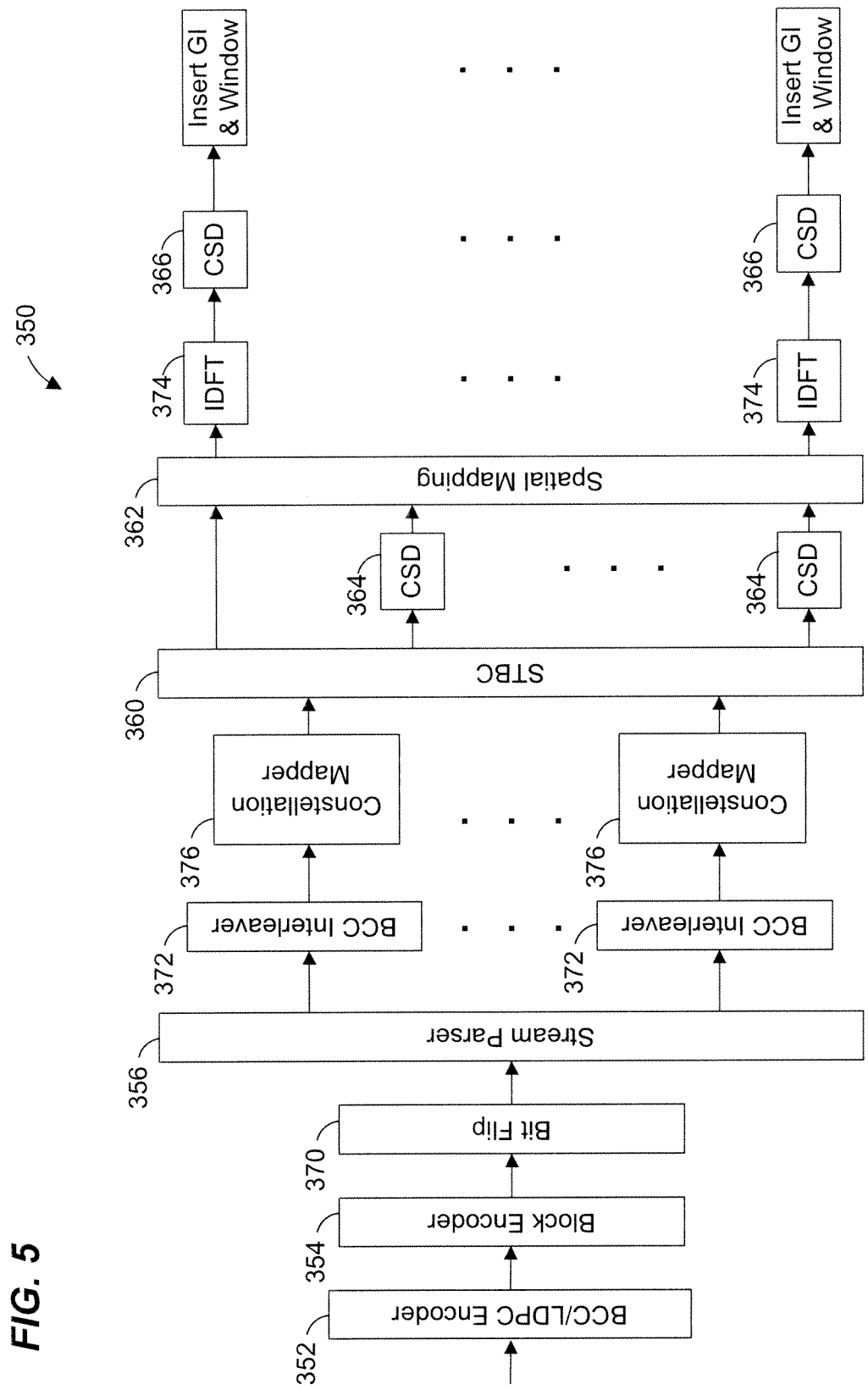
FIG. 5 is a block diagram of a transmit portion of another example PHY processing unit for generating low bandwidth mode data units, according to an embodiment.

FIGS. 3-5 are block diagrams of transmit portions of example PHY processing units for generating low bandwidth mode data units, according to various embodiments. Referring to FIG. 1, the PHY processing unit 20 of AP 14 and the PHY processing unit 29 of client station 25-1 are each similar to or the same as any one of the PHY processing units shown in FIGS. 3-5, in various embodiments. In some embodiments, the PHY processing units of FIGS. 3-5 correspond to the same hardware as the PHY processing unit 100 of FIG. 2, but with different signal processing operations being utilized within the hardware depending on whether normal mode or low bandwidth mode data units are being generated.

The PHY processing unit 150 of FIG. 3 includes a scrambler 152 which is similar to the scrambler 102 of FIG. 2, in an embodiment. The scrambler 152 is coupled to one or more FEC encoders 154, which in an embodiment is/are similar to the FEC encoder 106 of FIG. 2. In an embodiment where the PHY processing unit 150 includes two or more FEC encoders 154, an encoder parser (not shown) similar to encoder parser 104 of FIG. 2 is coupled between the scrambler 152 and FEC encoders 154.

A stream parser 158 is coupled to the output(s) of the FEC encoder(s) 154. The stream parser 158 is similar to the stream parser 108 of FIG. 2 (e.g., Equations 1 and 2, above, are satisfied), in an embodiment, with the exception that the relevant parameters for Equations 1 and 2 above (e.g., $N_{BPSCS}$ and $N_{SS}$) match the low bandwidth mode system parameters (e.g., $N_{SS}=1$ if only one spatial stream is permitted for low bandwidth mode data units). The stream parser 158 is coupled to the interleavers 160. The interleavers 160 are similar to interleavers 110 of FIG. 2, in an embodiment, with the exception that the parameters $N_{col}$, $N_{row}$, and $N_{rot}$ are suitable values based on the bandwidth of the low bandwidth data units. For example, in various embodiments in which the lowest bandwidth normal mode data units are 2 MHz data units generated using 64-point IDFTs, and in which the low bandwidth mode data units are 1 MHz data units generated using 32-point IDFTs and having 24 OFDM data tones, one of the following three options is implemented:

1) $N_{col}=12, N_{row}=2\times N_{BPSCS}$                    Equation 3

2) $N_{col}=8, N_{row}=3\times N_{BPSCS}$                     Equation 4

3) $N_{col}=6, N_{row}=4\times N_{BPSCS}$                     Equation 5 and $N_{rot}$ is one of {2, 3, 4, 5, 6, 7, 8}. For example, in one particular embodiment, Equation 4 is satisfied and $N_{rot}=2$. As another example, in various embodiments in which the lowest bandwidth normal mode data units are 2 MHz data units generated using 64-point IDFTs, and in which the low bandwidth mode data units are 0.5 MHz data units that are generated using 16-point IDFTs and have 12 OFDM data tones, one of the following two options is implemented:

1) $N_{col}=6, N_{row}=2\times N_{BPSCS}$                     Equation 6

2) $N_{col}=4, N_{row}=3\times N_{BPSCS}$                     Equation 7 and $N_{rot}$ is one of [2, 3, 4, 5].

Corresponding to each spatial stream, a constellation mapper 162 maps an interleaved sequence of bits to constellation points corresponding to different subcarriers/tones of an OFDM symbol. The constellation mappers 162 are similar to constellation mappers 112 of FIG. 2, in an embodiment.

In addition to, or instead of, any MCS restrictions described above (e.g., low bandwidth mode data units only being permitted to use a lowest MCS, etc.), in various embodiments, the allowed MCSs for low bandwidth mode data units are MCSs that satisfy the following equations:

$N_{CBPS}/N_{ES}=m$                     Equation 8

$N_{DBPS}/N_{ES}=n$                     Equation 9

$\mod(N_{CBPS}/N_{ES},D_R)=0$                     Equation 10

$R=N_R/D_R$                     Equation 11 where $N_{CBPS}$ is the number of coded bits per symbol. $N_{DBPS}$ is the number of uncoded bits per symbol, $N_{ES}$ is the number of BCC encoders, m and n are integers, R is the coding rate, and $D_R$ is the denominator of the coding rate (i.e., $D_R=2$ if R=1/2, $D_R=3$ if R=2/3, $D_R=4$ if R=3/4, and $D_R=5$ if R=5/6). In an embodiment, $N_{ES}$ always equals one for low bandwidth mode data units (i.e., one spatial stream and one BCC encoder, are used in low bandwidth mode). In other embodiments, $N_{ES}$ is a suitable number greater than one for low bandwidth mode data units.

In an embodiment, an STBC unit 164 (e.g., similar to STBC unit 114 of FIG. 2) receives the constellation points corresponding to the one or more spatial streams and spreads the spatial streams to a number of space-time streams. A plurality of CSD units 166 (e.g., similar to CSD units 116 of FIG. 2) are coupled to the STBC unit 164, which in turn is coupled to a spatial mapping unit 170 (e.g., similar to the spatial mapping unit 120 of FIG. 2). Each output of the spatial mapping unit 170 corresponds to a transmit chain, and each output of the spatial mapping unit 120 is operated on by an IDFT unit 172. The IDFT units 172 are similar to the IDFT units 122 of FIG. 2 and use the same clock rate as the IDFT units 122, in an embodiment, but use a smaller size IDFT than any normal mode data units. For example, in one embodiment where normal mode data units are generated using 64-point or larger IDFTs, low bandwidth mode data units are generated using 32-point IDFTs. In an alternative embodiment in which normal mode data units are generated using 64-point or larger IDFTs, low bandwidth mode data units are generated using 16-point IDFTs. In another alternative embodiment in which normal mode data units are generated using 64-point or larger IDFTs, low bandwidth mode data units are generated using either a 16-point or 32-point IDFT depending on which of two PHY sub-modes within a low bandwidth mode is selected.

Outputs of the IDFT units 172 are provided to GI insertion and windowing units 174 (e.g., similar to GI insertion and windowing units 124 of FIG. 2), and outputs of the GI insertion and windowing units 172 are provided to analog and RF units 176 (e.g., similar to analog and RF units 126 of FIG. 2). In one embodiment, the generated low bandwidth mode data units are then transmitted in a low bandwidth mode frequency band. In one embodiment in which normal mode transmissions utilize 2 MHz and greater bandwidth (e.g., 4 MHz, 8 MHz, etc.) channels, the frequency band for low bandwidth mode transmissions is 1 MHz. In other such embodiments, 0.5 MHz or another suitable bandwidth less than the minimum normal mode channel bandwidth is utilized.

While the example PHY processing unit 150 of FIG. 3 includes multiple spatial streams (one for each interleaver 160 and constellation mapper 162), the low bandwidth mode utilizes only a single spatial stream in other embodiments. For example, the low bandwidth mode is restricted to an MCS (e.g., MCS0 described above) in which only one spatial stream is utilized. In some of these embodiments, the stream parser 158 is omitted or not utilized. Moreover, the STBC unit 164 and/or CSD units 166 are omitted in some embodiments. Further, in one embodiment where FEC encoder 154 is an LDPC encoder rather than a BCC encoder, interleavers 160 are omitted. In an embodiment, the same LDPC parity matrix and parameters used for normal mode are also used for low bandwidth mode, and a puncturing/shortening/padding procedure utilizes the values of $N_{CBPS}$ and $N_{DBPS}$ (number of coded data bits per symbol and uncoded data bits per symbol, respectively) that correspond to the low bandwidth mode. In some embodiments, padding procedures that are used in the low bandwidth mode correspond to any such procedures described in U.S. application Ser. No. 13/366,064, filed on Feb. 3, 2012 and entitled "Control Mode PHY for WLAN," the disclosure of which is hereby incorporated by reference herein in its entirety.

FIGS. 4 and 5 illustrate transmit portions of example PHY processing units for generating low bandwidth mode data units in embodiments that use repetition to decrease the data rate and increase receiver sensitivity. For ease of explanation, certain units are not shown in FIGS. 4 and 5 even though the units are in some embodiments included. For example, each of the PHY processing units includes a scrambler, in various embodiments, such that the information bits input into the transmit flows depicted in FIGS. 4 and 5 are scrambled bits. In some embodiments, the low bandwidth mode only uses the repetition of FIG. 4 or FIG. 5 with BPSK modulation and/or with a single space-time stream, and does not use repetition (e.g., as in the example PHY processing unit 150 of FIG. 3) otherwise.

FIG. 4 illustrates an embodiment in which an example PHY processing unit 200 generates low bandwidth mode data units utilizing repetition of BCC-encoded bits, prior to mapping the bits to constellation symbols. A BCC encoder 204 accepts information bits and outputs the BCC-encoded bits to a block encoder 206. The block encoder 206 provides bit-level repetition (e.g. [b1 b1, b2 b2, . . . ] for 2× repetition) or block-level repetition (e.g., [b1 . . . b12, b1 . . . b12, b13 . . . b24, b13 . . . b24, . . . ] for 2× repetition with block size 12), in various embodiments. In one example embodiment, 2× repetition (rate 1/2 block coding) is used. In another example embodiment, 4× repetition (rate 1/4 block coding) is used. The block encoder 206 output couples to a bit flip unit 210 that changes the sign or polarity of select bits (e.g., every other bit) to reduce the peak-to-average power ratio (PAPR) of the generated OFDM signal. In some embodiments, the bit flip unit 210 is not included in the PHY processing unit 200.

The output of bit flip unit 210 (or of block encoder 206, if unit 210 is omitted) is coupled to BCC interleaver 212. The BCC interleaver 212 is similar to interleaver 160 of FIG. 3, in an embodiment. In some embodiments, the BCC interleaver 212 is not included in the PHY processing unit 200. The output of BCC interleaver 212 (or of bit flip unit 210 or block encoder 206, if BCC interleaver 212 is omitted) is coupled to constellation mapper 214. Constellation mapper 214 is similar to constellation mapper 112 of FIG. 2, in an embodiment. The constellation size utilized by constellation mapper 214 to generate low bandwidth mode data units is determined by the MCS mode, which in some embodiments is the lowest MCS (or an MCS lower than the lowest MCS) utilized for normal mode data units, as described above.

The output of the constellation mapper 214 is coupled to an IDFT unit 216. The IDFT unit 216 is similar to IDFT unit 172 of FIG. 3 (e.g., uses a 32-point or 16-point IDFT as compared to a 64-point or larger IDFT for normal mode data units), in an embodiment. The output of IDFT unit 216 is coupled to CSD unit 218, in some embodiments. In embodiments or scenarios in which the PHY processing unit 200 operates to generate low bandwidth mode data units for transmission via multiple transmit chains, the CSD unit 218 inserts acyclic shift into all but one of the transmit chains to prevent unintentional beamforming. In other embodiments, CSD unit 218 is omitted. The output of CSD unit 218 (or of IDFT unit 216, if CSD unit 218 is omitted) is coupled to GI insertion and windowing unit 220, and the output of GI insertion and windowing unit 220 is coupled to analog and RF unit 222. In various embodiments and/or scenarios, the generated low bandwidth mode data units are then transmitted in a 1 MHz or a 0.5 MHz bandwidth channel (e.g., corresponding to a 32-point or 16-point IDFT at unit 216, respectively). In other embodiments, one or more other suitable channel bandwidths (corresponding to other IDFT sizes) that are less than the minimum normal mode channel bandwidth is/are utilized.

In a more specific example embodiment, where IDFT unit 216 uses a 32-point IDFT to generate OFDM symbols having 24 data tones for low bandwidth mode data units, the BCC encoder 204 is a rate 1/2 BCC encoder that received 6 information bits per OFDM symbol and outputs 12 bits per OFDM symbol, the block encoder 206 is a rate 1/2 (2× repetition) block encoder that output 24 bits per OFDM symbol using block-level repetition, the 24 output bits are interleaved using a regular BCC interleaver, and constellation mapping unit 214 utilizes a BPSK modulation technique.

In one alternative embodiment, block encoder 206 is earlier in the transmit flow of FIG. 4 than BCC encoder 204 (i.e., repetition of bits occurs prior to BCC encoding), and bit flip unit 210 is omitted. In another alternative embodiment, block encoder 206 is instead coupled to the output of constellation mapper 214 (i.e. for repetition of constellation points) and bit flip unit 210 is omitted. In some of these latter embodiments, a phase shift unit (not shown in FIG. 4) is coupled to the block encoder 206 output to reduce the PAPR of the OFDM signal, and the output of the phase shift unit is coupled to the IDFT unit 216. If the phase shift unit is not included in the embodiment, the output of block encoder 206 is instead coupled to IDFT unit 216. In various embodiments, the processing unit 200 is configured to utilize any of the repetition techniques described in U.S. application Ser. No. 13/366,064.

FIG. 5 is a block diagram of a transmit portion of another example PHY processing unit 350 for generating low bandwidth mode data units, according to an embodiment. Generally, the various units shown in FIG. 5 are similar to the like units in FIG. 4. Unlike the example embodiment of FIG. 4, however, a BCC encoder 352 coupled to the block encoder 354 additionally utilizes LDPC encoding, and a stream parser 356, STBC unit 360, and spatial mapping unit 362 are included in PHY processing unit 350 to support multiple spatial streams and space-time streams. Moreover, in addition to CSD units 364, a second set of CSD units 366 is utilized on each of the space-time streams after the STBC unit 360, in an embodiment. In an embodiment, the second set of CSD units 366 is applied only if more than one space-time stream is transmitted, in order to reduce unintended beamforming during the short training field (which is primarily used to set automatic gain control (AGC) gain at the receiver). In other embodiments, the CSD units 366 are omitted. Moreover, in some embodiments, the bit flip unit 370 and/or BCC interleavers 372 is/are omitted. Further, in some embodiments, the block encoder 354 and bit flip unit 370 are only applied when more than one space-time stream is being transmitted.

In a more specific example embodiment, where IDFT unit 374 uses a 32-point IDFT to generate OFDM symbols having 24 data tones for low bandwidth mode data units, the BCC/LDPC encoder 352 is a rate 1/2 BCC/LDPC encoder that outputs $12 \times N_{SS}$ bits per OFDM symbol (where $N_{SS}$ is the number of spatial streams, the block encoder 354 is a rate 1/2 (2× repetition) block encoder that output $24 \times N_{SS}$ bits per OFDM symbol using block-level repetition, and each constellation mapper 376 uses BPSK modulation.

In one alternative embodiment, bit repetition occurs after stream parser 356 (i.e., in each spatial stream) rather than before stream parser 356. For example, in an embodiment, the block encoder 354 and (if present) bit flip unit 370 are included in each spatial stream, coupled between stream parser 356 and the corresponding BCC interleaver 372. As in the embodiment where bit repetition occurs before stream parser 356, the bit repetition is applied on a bit-by-bit basis in some embodiments, and on a block level in other embodiments.

FIG. 6 is a flow diagram of an example method 400 for generating first and second data units corresponding to first and second PHY modes, respectively, according to an embodiment. In an embodiment, the first PHY mode is a normal mode of a long range communication protocol and the second PHY mode is a low bandwidth mode of the long range communication protocol. For example, in one embodiment, the second PHY mode is a control mode. Alternatively, the second PHY mode simply provides range extension beyond the first PHY mode. The method 400 is implemented by the network interface 16 of AP 14 and/or the network interface 27 of client station 25-1 of FIG. 1, in various embodiments.

Generally, a first data unit corresponding to the first PHY mode is generated at blocks 402 and a second data unit corresponding to the second PHY mode is generated at blocks 404. First with reference to blocks 402, a first plurality of information bits is FEC encoded at block 410. For example, in one embodiment, the first information bits are BCC encoded. As another example, in an embodiment, the first information bits are LDPC encoded. In some embodiments, at least a portion of the first plurality of information bits corresponds to a data portion of the first data unit being generated. Further, in some embodiment, an additional portion of the first plurality of information bits corresponds to a signal field of a preamble of the first data unit being generated.

At block 412, the FEC-encoded first information bits are mapped to a first plurality of constellation symbols. The number of FEC-encoded bits being mapped is greater than the number of information bits prior to FEC encoding by a factor related to the coding rate used at block 410. For example, if R=1/2 BCC encoding is used at block 410, two FEC-encoded first information bits are produced (and operated on at block 412) for each information bit operated on at block 410. The constellation mapping at block 412 is similar to the mapping performed by constellation mappers 112 of FIG. 2, in an embodiment. The first plurality of constellation symbols corresponds to the particular modulation technique being employed for each OFDM subcarrier. For example, the first plurality of constellation symbols consists of only +1 and −1 in an embodiment where BPSK modulation is utilized.

At block 414, first OFDM symbols are generated to include the first constellation symbols produced at block 412. Each of the first OFDM symbols utilizes a first tone spacing, and includes a first number of non-zero tones that collectively span a first bandwidth. In one embodiment in which the first data units are long range data units, for example, the non-zero tones (data and pilot tones) are arranged according to the IEEE 802.11n or IEEE 802.11ac Standard, but with a smaller tone spacing determined by the down-clocking ratio.

Referring next to blocks 404, a second plurality of information bits is FEC encoded at block 416. Block 416 is similar to block 410, in an embodiment. In some embodiments, at least a portion of the second plurality of information bits corresponds to a data portion of the second data unit being generated. Further, in some embodiment, an additional portion of the second plurality of information bits corresponds to a signal field of a preamble of the second data unit being generated.

At block 420, the FEC-encoded second information are block encoded. In various example embodiments, 2× repetition (rate 1/2 block coding) or 4× repetition (rate 1/4 block coding) is used. In one embodiment, the block encoding at block 420 provides bit-level repetition (e.g., [b1 b1, b2 b2, ...] for 2× repetition). In another embodiment, the block encoding at block 420 provides block-level repetition. In this latter embodiment, block 420 includes partitioning the second information bits into blocks of n information bits, and repeating each block of n information bits m times to generate m*n information bits. For example the bit sequence [b1 ... b12, b1 ... b12, b13 ... b24, b13 ... b24, ...] is produced if m=2 (2× repetition) and n=12. In some embodiments, block 420 also includes interleaving the generated m*n information bits.

At block 422, the block-encoded second information bits are mapped to a second plurality of constellation symbols. Block 422 is similar to block 412, in an embodiment. The constellation mapping at block 422 is similar to the mapping performed by constellation mapper 214 of FIG. 4 or constellation mappers 376 of FIG. 5, in various embodiments. The second plurality of constellation symbols corresponds to the particular modulation technique being employed for each OFDM subcarrier. For example, the second plurality of constellation symbols consists of only +1 and −1 in an embodiment where BPSK modulation is utilized. In some embodiments and/or scenarios, the second plurality of constellation symbols utilized at block 422 is the same as the first plurality of constellation symbols utilized at block 412 (i.e., the modulation types are the same). In other embodiments and/or scenarios, the s second plurality of constellation symbols utilized at block 422 is different than the first plurality of constellation symbols utilized at block 412 (e.g., block 422 uses a modulation type having a smaller set of constellation symbols).

At block 424, second OFDM symbols are generated to include the second constellation symbols produced at block 422. Each of the second OFDM symbols utilizes a second tone spacing, and includes a second number of non-zero tones that collectively span a second bandwidth. The second tone spacing is the same as the first tone spacing of the first OFDM symbols generated at block 414 (i.e. the same clock rate is used at blocks 414 and 424). The second number of non-zero tones is less than the first number of non-zero tones in the first OF DM symbols generated at block 414. The non-zero tones of the second OFDM symbols collectively span a second bandwidth that is less than the first bandwidth of the first OFDM symbols.

In some embodiments, the number of non-zero tones in the OFDM symbols generated at block 422 is no more than half the number of non-zero tones in the OFDM symbols generated at block 414, and the second bandwidth is no more than half the first bandwidth. For example, in one embodiment where the second data unit bandwidth is half the first data unit bandwidth, generating the first OFDM symbols includes utilizing a 64-point IDFT, and generating the second OFDM symbols includes either utilizing a 64-point IDFT and zeroing out at least half of the resulting tones, or utilizing a 32-point IDFT. Example tone maps are shown and discussed below in connection with FIGS. 7A and 7B.

In some embodiments, the second data unit is generated using an MCS lower than or equal to the lowest MSC that may be used to generate the first data unit. For example, in an embodiment, the FEC encoding at block 410 is performed according to a first MCS selected from a plurality of MCSs corresponding to a plurality of relative throughput levels, the mapping at block 412 is performed according to the first MCS, the FEC encoding at block 416 is performed according to a second MCS corresponding to a relative throughput level lower than or equal to a lowest relative throughput level of the plurality of relative throughput levels, and the mapping at block 422 is performed according to the second MCS.

The method 400 includes additional blocks not shown in FIG. 6, in various embodiments. In one embodiment, for example, the first information bits are scrambled prior to FEC encoding at block 410 and the second information bits are scrambled prior to FEC encoding at block 416.

Figure 7A:
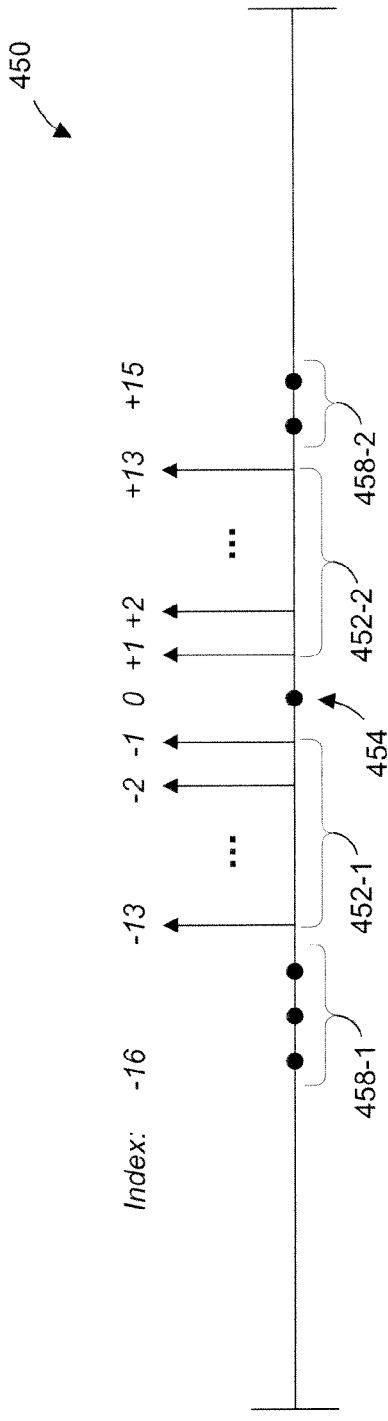
FIGS. 7A and 7B are diagrams of example tone maps corresponding to low bandwidth mode data units, according to two embodiments.
Figure 7B:
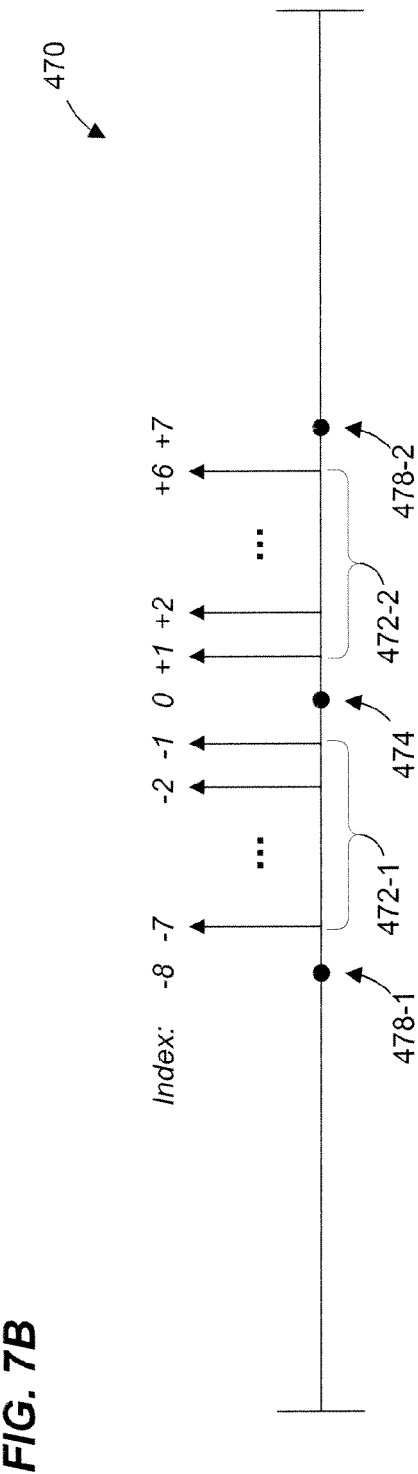

FIGS. 7A and 7B are diagrams of example OFDM symbol tone maps 450, 470 corresponding to low bandwidth mode data units, according to two embodiments. More specifically, the tone maps 450, 470 correspond to low bandwidth mode data units (e.g., in the data and signal field portions) in an embodiment in which normal mode data units correspond to down-clocked IEEE 802.11n or IEEE 802.1 ac data units generated using 64-point or larger (e.g., 128-, 256-, and/or 512-point) IDFTs. In an embodiment, the tone maps 450, 470 correspond to data units generated by the PHY processing unit 150 of FIG. 3, the PHY processing unit 200 of FIG. 4, or the PHY processing unit 350 of FIG. 5, and/or the second PHY mode data units generated in the blocks 404 of method 400 in FIG. 6.

The first example tone map 450 in FIG. 7A corresponds to a tone map of a low bandwidth mode OFDM symbol generated using a 32-point IDFT. Of the 32 total tones, two sets 452 of non-zero tones correspond to data and pilot tones, a center (zeroed) tone 454 serves as the DC tone, and two sets 458 of tones serve as (zeroed) guard tones. In one example embodiment where the 64 tones of normal mode OFDM symbols collectively span a 2 MHz bandwidth, the 32 tones of tone map 450 collectively span a 1 MHz bandwidth. Thus, the non-zero tones 452-1 and 452-2 of tone map 450 collectively span a bandwidth that is slightly less than half of the bandwidth collectively spanned by the non-zero tones of the 64-point IDFT normal mode OFDM symbols.

In one embodiment, the non-zero tones 452 include only 24 data tones (e.g. 12 data tones in lower sideband tones 452-1 and 12 data tones in upper sideband tones 452-2) and only two pilot tones (e.g., one pilot tone at the +7 index and one pilot tone at the −7 index), the lower-edge guard tones 458-1 include only three tones, and the upper-edge guard tones 458-2 include only two tones. In some embodiments, the non-zero tones 452 consist of any one of 18, 20, 22, 24, or 26 data tones and any one of two or four pilot tones, and the guard tones 458 consist of any one of three or five guard tones. In various different embodiments, more guard tones 458 are included on the lower edge of tone map 450 than the upper edge, or vice versa. Moreover, the two or four pilot tones are at any set of positions within tone map 450 in various different embodiments. In some embodiments, the tone map 450 includes more than one DC tone 454.

The second example tone map 470 in FIG. 7B corresponds to a tone map of a low bandwidth mode OFDM symbol generated using a 16-point IDFT. Of the 16 total tones, two sets 472 of non-zero tones correspond to data and pilot tones, a center (zeroed) tone 474 serves as the DC tone, and two sets 478 of tones serve as (zeroed) guard tones. In one example embodiment where the 64 tones of normal mode OFDM symbols collectively span a 2 MHz bandwidth, the 16 tones of tone map 470 collectively span a 0.5 MHz bandwidth. Thus, in an embodiment, the non-zero tones 472-1 and 472-2 of tone map 470 collectively span a bandwidth that is slightly less than one-fourth the bandwidth collectively spanned by the non-zero tones of the normal mode OFDM symbols.

In one embodiment, the non-zero tones 472 include only 12 data tones (e.g. six data tones in lower sideband tones 472-1 and six data tones in upper sideband tones 472-2) and only one pilot tone, the lower-edge guard tones 478-1 include only one tone, and the upper-edge guard tones 478-2 include only one tone. In some embodiments, the non-zero tones 472 consist of any one of 11 or 12 data tones and any one of one or two pilot tones, and the guard tones 478 consist of only two guard tones. In various different embodiments, the one or two pilot tones are at any set of positions within tone map 470. In some embodiments, the tone map 470 includes more than one DC tone 474.

Figure 8:
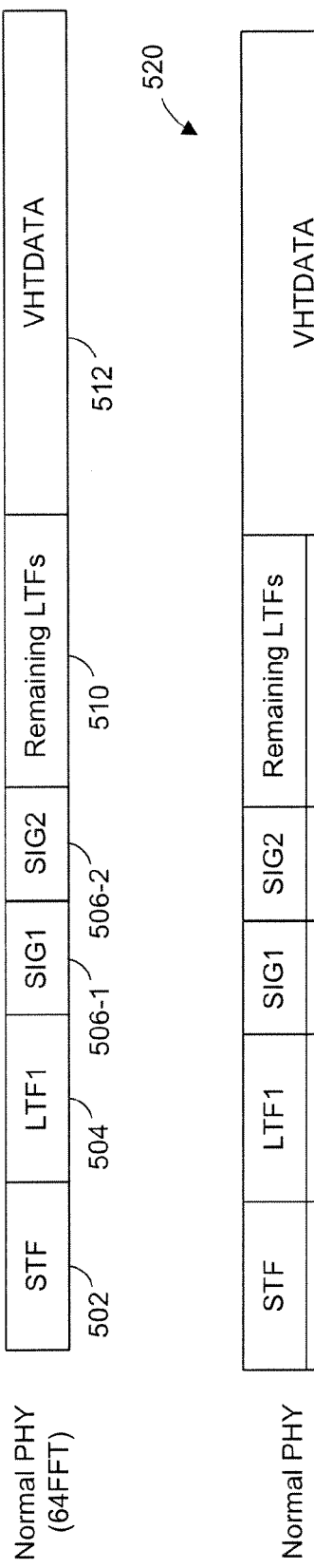
FIG. 8 is a diagram of example normal mode data units having different bandwidths, according to an embodiment.

FIG. 8 is a diagram of example normal mode data units 500, 520 having different bandwidths, according to an embodiment. The normal mode data units 500, 520 are down-clocked versions of data units conforming to a short range protocol. For the particular embodiment shown in FIG. 8, the normal mode data units 500, 520 are down-clocked versions of IEEE 802.11n data units using the "Greenfield" (rather than mixed mode) preamble. In other embodiments, the normal mode data units 500, 520 are down-clocked versions of data units conforming to other short range protocols. Different examples of normal mode data units according to various embodiments are described in U.S. patent application Ser. No. 13/359,336.

The normal mode data unit 500 corresponds to a lowest normal mode channel bandwidth (e.g., 2 MHz utilizing a 64-point IDFT), and includes a short training field (STF) 502, a first long training field (LTF1) 504, a first signal (SIG1) field 506-1, a second signal (SIG2) field 506-2, remaining LTFs 510 (e.g. one additional LTF per spatial stream), and a very high throughput data (VHTDATA) portion 512. Generally, the STF 502 is used for packet detection, initial synchronization, and automatic gain control, etc., the LTFs 504 are used for channel estimation and fine synchronization, and the SIG fields 506 are used to carry certain physical layer (PHY) parameters of the data unit 200, such as signal bandwidth (e.g., 2 MHz for data unit 500), modulation type, and coding rate used to transmit the data unit, for example.

For higher bandwidth normal mode data units, the STF, LTFs, and SIG fields are duplicated in each of multiple sub-bands, each sub-band having a bandwidth equal to the lowest normal mode channel bandwidth. For example, where data unit 500 is the minimum-bandwidth normal mode data unit and has a 2 MHz bandwidth, data unit 520 duplicates the STF 522, LTFs 524, 530, and SIG fields 526 in each 2 MHz band as a preamble to the data portion 532, and the data portion 532 occupies the full (4 MHz) bandwidth without frequency duplication. A receiver detecting normal mode data unit 500 or 520 is able to determine the bandwidth of the data unit based on bandwidth information in SIG fields 506 and/or SIG fields 526, in an embodiment.

Figure 9:
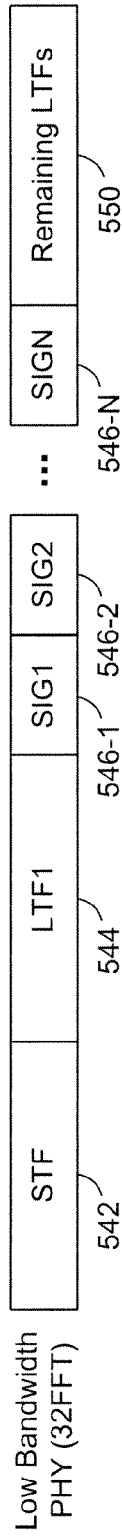
FIG. 9 is a diagram of a preamble of an example low bandwidth mode data unit, according to an embodiment.

FIG. 9 is a diagram of a preamble of an example low bandwidth mode data unit 540, according to an embodiment. The low bandwidth mode data unit 540 is generated using the same clock rate as the normal mode data units 500, 520, but utilizing a smaller size IDFT to reduce the bandwidth. For example, in one embodiment in which the normal mode data units 500 and 520 correspond to 2 and 4 MHz bandwidths (generated using 64- and 128-point IDFTs), respectively, the low bandwidth mode data unit 540 has a 1 MHz bandwidth, and is generated using a 32-point IDFT. Similar to the normal mode data unit 500, the low bandwidth mode data unit 540 includes an STF 542, an LTF 1544, a SIG1 field 546-1, a SIG2 field 546-2, and remaining LTFs 550 (e.g., one additional LTF per spatial stream, if more than one spatial stream is utilized for low bandwidth mode data units). The low bandwidth mode data unit 540, however, also includes additional SIG fields, in an embodiment. Moreover, in some embodiments, various fields within the preamble of low bandwidth mode data unit 540 differ in various ways from the corresponding fields in the normal mode data units 500, 520, as described in further detail below with reference to FIGS. 10-15. Generally, any of the low rate PHY preambles described in U.S. application Ser. No. 13/366,064 are utilized for low bandwidth mode data units, in various embodiments, but with a reduced bandwidth as compared to normal mode data units. In some embodiments, the low bandwidth mode data unit 540 also includes a data portion (not shown) having the same bandwidth as the preamble of the data unit 540.

In an alternative embodiment, the SIG fields 506 of the normal mode data unit 500 (and, in an embodiment, the SIG fields 526 of the wider bandwidth normal mode data unit 520) shown in FIG. 8 is duplicated across sub-bands of the normal mode channel, where each sub-band is equal to the bandwidth of the low bandwidth mode data unit. For example, a 2 MHz normal mode data unit includes SIG fields duplicated in two 1 MHz sub-bands, in an embodiment, in a manner similar to that shown for normal mode data unit 520. In an embodiment, other fields (e.g. STF, LTF, and data) are not duplicated across the channel bandwidth. Each duplicated SIG field has the same format as the SIG field in the low bandwidth mode data unit, in this embodiment. Moreover, in this embodiment, additional OFDM symbols are included in the SIG field. For example, if in a 64-point IDFT normal mode SIG field would include two OFDM symbols, a normal mode SIG field with two duplicated 32-point IDFT SIG fields includes four OFDM symbols, in an embodiment. In one embodiment, a "bandwidth field" is included in a SIG field that is in a sub-band commonly used for both 32-point and 64-point IDFT signals. Moreover, in an embodiment, a phase shifter is used on the two sub-bands to reduce PAPR of the SIF field. In an embodiment, an LTF preceding the duplicated SIG field includes pilot tones in each sub-band that are the same as the overlapping pilot tones of the low bandwidth mode LTF.

The STF 542 of the low bandwidth mode data unit 540 is used by a receiver for various purposes, including automatic gain control (AGC). The receiver measures the power level of the data unit 540 during the STF 542, and sets the AGC gain target accordingly to reduce clipping of the remainder of the received signal. In one embodiment, however, the power level of the STF 542 is boosted relative to the rest of the data unit 540. For example, in one embodiment, the power is boosted by 3 dB. In other embodiments, other suitable levels of power boost are used. The power boost facilitates detection of the data unit 540 at the receiver. Moreover, boosting the power of the STF 542 by a suitable amount does not tend to cause significant clipping, because the STF 542 generally includes fewer non-zero tones, and therefore has a lower PAPR, than the remainder of data unit 540.

In an embodiment, the power boost (e.g., 3 dB power boost) is only applied by a transmitting device for STFs of low bandwidth mode data units, and not for STFs of normal mode data units. In another embodiment, the power boost (e.g., 3 dB power boost) is only applied by a transmitting device for STFs of low bandwidth mode data units that are modulated at the lowest data rate (e.g., BPSK modulation, single stream, and with a bit repetition block as shown in FIG. 4 or 5, in an embodiment), and is not applied for STFs of normal mode data units and/or for STFs of low bandwidth mode data units that are not modulated using bit repetition. While the increased average transmit power level can cause a receiver to decrease the AGC gain when receiving a low bandwidth mode data unit with a power-boosted STF, the increased quantization error at the analog-to-digital converter (ADC) is generally tolerable due to the robust nature of the low bandwidth mode signal (e.g., a signal having 2× or 4× repetition, using a lowest MCS, etc.) as compared to normal mode signals.

Figure 10:
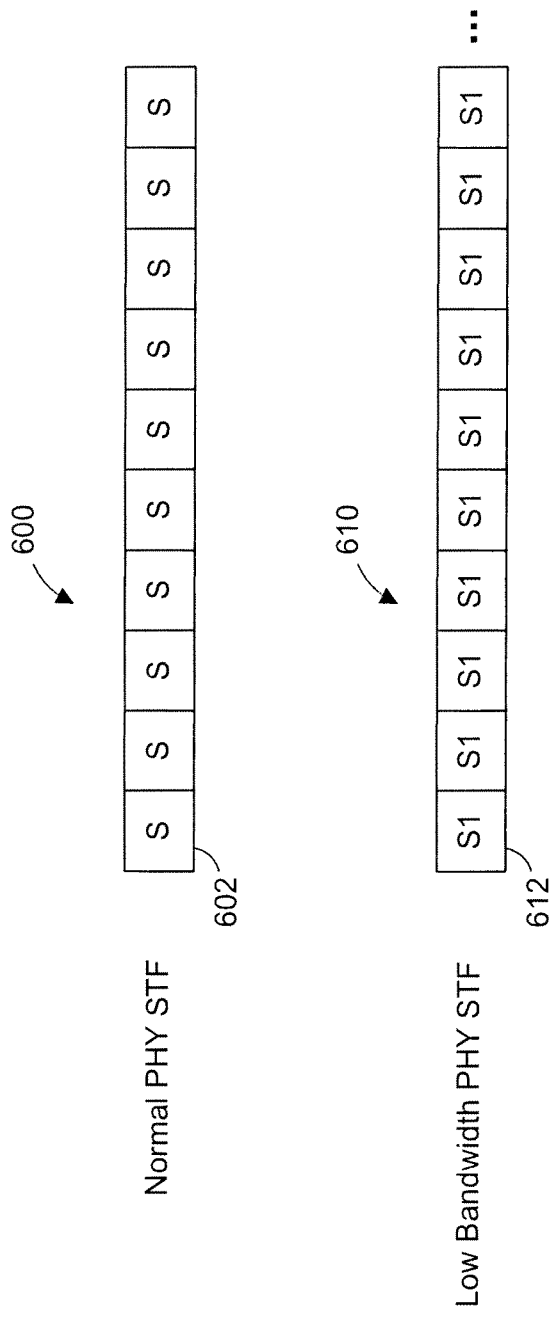
FIG. 10 is a diagram of an example short training field (STF) of a normal mode data unit and an example STF of a low bandwidth mode data unit, according to an embodiment.
Figure 11:
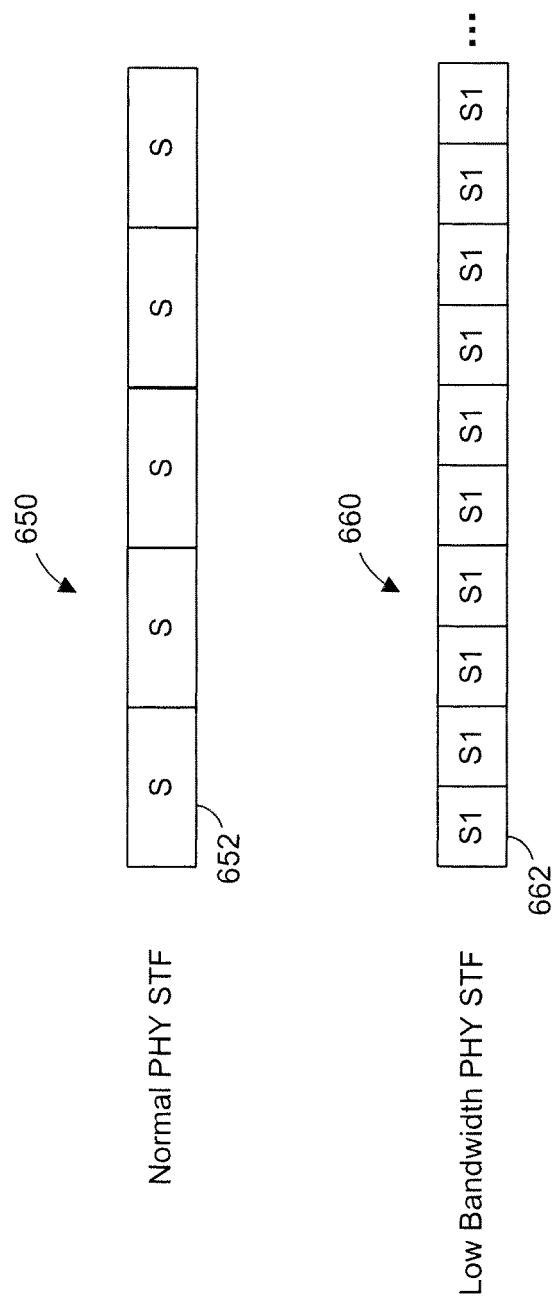
FIG. 11 is a diagram of another example STF of a normal mode data unit and another example STF of a low bandwidth mode data unit, according to an embodiment.

FIGS. 10 and 11 depict example normal mode and low bandwidth mode STFs corresponding to the normal mode and low bandwidth mode preambles, respectively, of the data units shown in FIGS. 8 and 9, according to different embodiments. More specifically, the normal mode STFs of FIGS. 10 and 11 correspond to the STFs 502, 522 of FIG. 8 and the low bandwidth mode STFs of FIGS. 10 and 11 correspond to the STF 542 of FIG. 9.

Referring first to FIG. 10, an example normal mode STF 600 includes a repeating first sequence (S) 602, while an example low bandwidth mode STF 610 includes a repeating second sequence (S1) 612 that is different than the first sequence 602. The first sequence 602 and the second sequence 612 have the same sequence duration/period, but the number of repetitions of the first sequence 602 in STF 600 is less than the number of repetitions of the second sequence 612 in STF 610. For example, in an embodiment, the first sequence 602 is repeated 10 times in STF 600 while the second sequence 612 is repeated more than 10 times in STF 610 (i.e., the low bandwidth mode STF 610 has a longer total duration than the normal mode STF 600). In another embodiment, the first sequence 602 is repeated the same number of times as the second sequence 612 (e.g., 10 times for each), such that STF 600 and STF 610 have the same total duration.

The normal mode STF 600 is the same as the STF defined in the IEEE 802.11n Standard, in an embodiment. For example, the STF 600 includes 10 repetitions of the sequence 602, with five sequences 602 per OFDM symbol, and with each OFDM symbol having one non-zero tone every fourth tone in the frequency domain (except for a zeroed DC tone), in an embodiment. To achieve the same sequence periodicity as STF 600, STF 610 utilizes the same spacing of non-zero tones as STF 600 (e.g. a non-zero value every fourth tone, except for the zeroed DC tone), in an embodiment. For example, the OFDM symbols of the low bandwidth mode STF 610 (when generated using a 32-point IDFT) include non-zero values for only tones +/−12, +/−8, and +/−4, in an embodiment. In some embodiments, the non-zero values of these tones are any values that are not equal or alternating (i.e., are not periodic in the frequency domain). For example, in an embodiment, the six tone values p(i) are [p(−12), p(−8), p(−4), p(4), p(8), p(12)]=a[sqrt(2), 1+j, sqrt(2)*j, sqrt(2), 1−j, −1−j], where i is the tone index and a is a scaling factor.

In some embodiments, low bandwidth mode data units are generated utilizing a same IDFT size as the minimum bandwidth normal mode data units, but with additional, unused tones being zeroed out. For example, in an embodiment where normal mode data units are generated using at least a 64-point IDFT, low bandwidth mode data units are also generated using a 64-point IDFT, but with one unused sideband of tones being zeroed out. In these embodiments, the tone map for STF 610 described above is shifted to the lower sideband (tones −32 to −1) or to the upper sideband (tones 0 to 31), depending on which of those sub-bands is used for low bandwidth mode data units. For example, if the lower sideband is used, the non-zero tones described above as being located at indices +/−12, +/−8, and +/−4 are instead located at indices −28, −24, −20, −12, −8, and −4.

In some embodiments, some additional tones in the OFDM symbols of STF 610 are punctured (zeroed out). In various embodiments, between one and four tones of the six non-zero tones described above are punctured. For example, in one embodiment where a 32-point IDFT is used to generate the low bandwidth mode data units, the +/−12 index tones are punctured so that four tones remain at +/−8 and +/−4. As another example, in another embodiment where a 32-point IDFT is used to generate the low bandwidth mode data units, the +/−8 index tones are punctured so that four tones remain at +/−12 and +/−4. As another example, in yet another embodiment where a 32-point IDFT is used to generate low bandwidth mode data units, the −12 index tone is punctured so that five tones remain at +12, +/−8, and +/−4. By puncturing between one and four of the tones in these or other ways, the first sequences 602 in STP 600 remain periodic with respect to (e.g., have a period that is an integer multiple of) the period of the second sequences 612 in STF 610.

In an alternative embodiment, the sign of every other sequence of the second sequences 612 is flipped (e.g., [S1 −S1 S1 −S1 . . . ]), such that the effective period of the low bandwidth mode STF 610 is equal to two times the period of the first sequence 602 of the normal mode STF 600 (i.e. a sequence S2 equal to [S1-S1] in STF 610 has twice the duration/period of the sequence 602 in STF 600). In this embodiment, the normal mode STF 600 has the same STF tone design as defined in the IEEE 802.11n and IEEE 802.11ac Standards, with non-zero tones at +/−24, +/−20, +/−16, +/−12, +/−8, and +−4:

$$S_{-26,26}=\text{sqrt}(1/2)\{0,0,1+j,0,0,0,-1-j,0,0,0,1+\\j,0,0,0,-1-j,0,0,0,-1-j,0,0,0,1+\\j,0,0,0,0,0,0,0,-1-j,0,0,0,-1-j,0,0,0,1+\\j,0,0,0,1+j,0,0,0,1+j,0,0,0,1+j,0,0\}$$ Equation 12

In this embodiment, the low bandwidth mode STF 610 truncates $S_{-26,26}$ down to the tone values within the indices [−13, 13] in Equation 12 above, and shifts the non-zero tones within those indices to the right or left by two tones (and also, optionally, inserts one new, non-zero value in place of the shifted zero DC tone), to achieve the repeating S1/−S1 pattern. Thus, if the tones are shifted two to the right, the non-zero tones produced by the 32-point IDFT are at −10, −6, −2, 6, and 10 (five non-zero tones), or, if a new tone inserted, at −10, −6, −2, 2, 6, and 10 (six non-zero tones). If the tones are instead shifted two to the left, the non-zero tones produced by the 32-point IDFT are at −10, −6, 2, 6, and 10 (five non-zero tones), or, if a new tone is inserted, at −10, −6, −2, 2, 6, and 10 (six non-zero tones). Any suitable value may be used for the new inserted tone, if one is included. Moreover, in various alternative embodiments, any other suitable non-zero values are used in place of the non-zero values shown in Equation 12.

Referring next to FIG. 1 an example normal mode STF 650 includes a repeating first sequence (S) 652, while an example low bandwidth mode STF 660 includes a repeating second sequence (S1) 662 that is different than the first sequence 652. The second sequence 662 has a sequence period/duration that is half the sequence duration/period of the first sequence 652, and the number of repetitions of the second sequence 662 in STF 660 is greater than twice the number of repetitions of the first sequence 652 in STF 650. For example, in an embodiment, the first sequence 652 is repeated 10 times in STF 650 while the second sequence 662 is repeated more than 20 times in STF 660 (i.e., the low bandwidth mode STF 660 has a longer total duration than the normal mode STF 650). In another embodiment, the second sequence 662 is repeated exactly twice the number of times as the first sequence 652 (e.g., 20 and 10 times, respectively), such that STF 660 and STF 650 have the same total duration.

The normal mode STF 650 is the same as the STF defined in the IEEE 802.11n Standard, in an embodiment. For example, the STF 650 includes 10 repetitions of the sequence 652, with five sequences 652 per OFDM symbol, and with each OFDM symbol having one non-zero tone every fourth tone in the frequency domain (except for a zeroed DC tone), in an embodiment. To achieve half the sequence periodicity of STF 650, STF 660 utilizes twice the spacing of non-zero tones as STF 600 (e.g., anon-zero value every eighth tone, except for the zeroed DC tone), in an embodiment. For example, the OFDM symbols of the low bandwidth mode STF 660 (when generated using a 32-point IDFT) include non-zero values for only two tones (+/−8), in an embodiment. In some embodiments, the non-zero values of these tones are any values that satisfy the criteria p(−8)!=p(8) and p(−8)!=−p(8). For example, in an embodiment, the two tone values p(i) are [p(−8), p(8)] a[sqrt(2), 1+j], where i is the tone index and a is a scaling factor.

In an embodiment where normal mode data units are generated using at least a 64-point IDFT, and where low bandwidth mode data units are also generated using a 64-point IDFT but with one unused sideband of tones being zeroed out, the tone map for STF 660 described above is shifted to the lower sideband (tones −32 to −1) or to the upper sideband (tones 0 to 31), depending on which of those sub-bands is used for low bandwidth mode data units. For example, if the lower sideband is used, the non-zero tones described above as being located at indices +/−8 are instead located at indices −24 and −8. If the upper sideband is used, the non-zero tones are instead located at indices +8 and +24.

In an alternative embodiment, the sign of every other sequence of the second sequences 662 is flipped (e.g., [S1 −S1 S1 −S1 . . . ]), such that the effective period of the low bandwidth mode STF 660 is equal to the period of the first sequence 652 of the normal mode STF 650 (i.e., a sequence S2 equal to [S1-S1] in STF 660 has the same duration/period as the sequence 662 in STF 660). In this embodiment, only tones +/−12 and +/−4 have non-zero values. It is noted that this embodiment corresponds to one of the puncturing embodiments described above with reference to FIG. 10, in a specific case in which the tones +/−8 are punctured. In some embodiments, the non-zero values of the tones are any values that are not equal or alternating (i.e., are not periodic in the frequency domain). For example, in an embodiment, the four tone values p(i) are [p(−12), p(−4), p(4), p(12)] a[−1−j, −1−j, 1+j, −1−j], where i is the tone index and a is a scaling factor. This tone map is shifted down or up 16 tones in embodiments where low bandwidth mode data units are generated using a 64-point IDFT but with one unused sideband of tones zeroed out. For example, if the lower sideband is used, the non-zero tones described above as being located at indices +/−12 and +/−4 are instead located at indices −28, −20, −12, and −4.

Different designs may be utilized for the tone map of the normal mode STF (e.g., STF 602 of FIG. 10 or STF 652 of FIG. 11), as described below in various sets of embodiments. It is understood that some of the sets of embodiments described below may overlap in scope with certain other sets of embodiments described below, and/or may overlap in scope with certain normal mode STFs shown in FIGS. 10 and 11.

In one set of embodiments, and regardless of which low bandwidth mode STF described above is utilized, the normal mode STF is unchanged from the IEEE 802.11a/n STF, i.e., non-zero values are only at tones +/−24, +/−20, +/−16, +/−12, +/−8, and +/−4 of the 64-point IDFT. Any suitable values are used for the non-zero tones such that the non-zero values of the tones are not equal or alternating (i.e. are not periodic in the frequency domain). Alternatively, in an embodiment, the tones at indices +/−28 also have non-zero values. In either of these embodiments, any suitable values are used for the non-zero tones such that the non-zero values of the tones are not equal or alternating (i.e., are not periodic in the frequency domain).

In another set of embodiments, where the low bandwidth mode STF tones are arranged according to either of the embodiments described above with reference to FIG. 11 (e.g., non-zero tones at +/−8 or non-zero tones at +/4 and +/−12), the normal mode STF tone plan is complementary to the low bandwidth mode STF tone plan. In these embodiments, the normal mode STF includes non-zero tones at +/−24, +/−20, +/−16, +/−12, +/−8, and +/−4 of the 64-point IDFT, except that any tones that would align with a low bandwidth mode STF tone (if duplicated in each sideband of the 64-point IDFT tone set) are zeroed out. For example, in the above embodiment where the low bandwidth mode includes only non-zero values at +/−8 of the 32-point IDFT tones (which translates to indices +/−24 and +/−12 of the 64-point IDFT tones), the normal mode STF includes non-zero values only at indices +/−20, +/−16, +/−8, and +/−4. As another example, in the above embodiment where the low bandwidth mode includes only non-zero values at +/−12 and +/−4 of the 32-point IDFT tones (which translates to indices +/−28, +/−20, +/−12, and +/−4 of the 64-point IDFT tones), the normal mode STF includes non-zero values only at indices +/−24, +/−16, and +/−8. These complementary designs provide separation between the normal mode and low bandwidth mode STFs. Thus, a receiver is more easily able to auto-detect the PHY mode based on the STF by running cross-correlators of one period of the normal mode STF sequence and one period of the low bandwidth mode STF sequence, with minimal cross-trigger due to the non-overlapping tones.

In yet another set of embodiments, the normal mode STF tone map is designed in conjunction with the low bandwidth mode STF in any suitable manner such that the normal mode and low bandwidth mode STFs have both the same sequence periodicity and the same STF duration (i.e. the same number of OFDM symbols in the STF). Any of the normal mode STF embodiments described above and any of the low bandwidth mode STF embodiments described above that satisfy these criteria are included in this set of embodiments. These embodiments include normal mode STFs having non-zero tones at indices that are the same as, partially overlap, or are complementary to the tones of the low bandwidth mode STF (if the low bandwidth mode STF were duplicated in the lower and upper sidebands of the normal mode tone set). For example, in an embodiment, the normal mode (64-point IDFT) STF includes non-zero tones only at indices +/−24, +/−20, +/−16, +/−12, +/−8, and +/−4, while the low bandwidth mode (32-point IDFT) STF includes non-zero tones only at indices +/−12, +/−8, and +/−4. In this example embodiment, the tones only partially overlap but result in STF sequences having the same periodicity. As another example, in an embodiment, the tones are complementary (as described above), and the normal mode STF duration is greater than the low bandwidth mode STF duration.

In some of these embodiments, because both the normal mode and low bandwidth mode STFs have the same periodicity and duration in the time domain, a receiving device does not auto-detect the PHY mode during the STF, and instead performs unified STF processing. The receiver instead performs auto-detection of the PHY mode during the LTF and/or SIG field, as discussed below, in these embodiments.

Alternatively, in an embodiment, the normal mode STF and low bandwidth mode STF have different durations. For example, in an embodiment, the normal mode (64-point IDFT) STF includes non-zero tones only at indices +/−24, +/−20, +/−16, +/−12, +/−8, and +/−4, the low bandwidth mode (32-point IDFT) STF includes non-zero tones only at indices +1-12, +/−8, and +/−4 (i.e. the normal mode and low bandwidth mode STFs have the same periodicity), and the low bandwidth mode STF has a longer duration than the normal mode STF (e.g., as shown in FIG. 10).

With reference again to FIGS. 10 and 11, a receiving device, in an embodiment, includes cross-correlators corresponding to the first sequence 602 or 652 and the second sequence 612 or 662 to automatically detect the PHY mode of a received data unit, i.e., to detect whether the received data unit is a normal mode or a low bandwidth mode data unit. In another embodiment, where normal mode and low bandwidth mode STFs have different (larger or smaller) periodicities of repeating sequences, a receiving device auto-detects the PHY mode of a received data unit by determining which periodicity is used. In yet another embodiment, a receiving device auto-detects the PHY mode of a received data unit by detecting the presence or absence of energy in one or more sub-bands within a channel. For example, in one embodiment where the normal mode STF 600 occupies a 2 MHz channel, and where the low bandwidth mode STF 610 occupies a 1 MHz sub-band at a location within the 2 MHz channel that is known a priori by the receiving device, the receiver determines that a received data unit is a normal mode data unit if the STF signal energy is detected across the entire 2 MHz channel, and is a low bandwidth mode data unit if the STF signal energy is detected only in the known 1 MHz sub-band.

In still other embodiments, the STFs of received data units are not used to auto-detect the PHY mode. FIGS. 12-17 illustrate preamble designs and method flow diagrams utilized when auto-detection of the PHY mode is not based on the STF, but instead based on a second preamble portion (e.g., based on an LIF and/or SIG field). In other embodiments, auto-detection of PHY mode based on the second preamble portion according to any one of the designs and/or methods described below is used in conjunction with auto-detection of PHY mode based on the STF according to any one of the designs and/or methods described above with reference to FIGS. 10 and 11.

Figure 12:
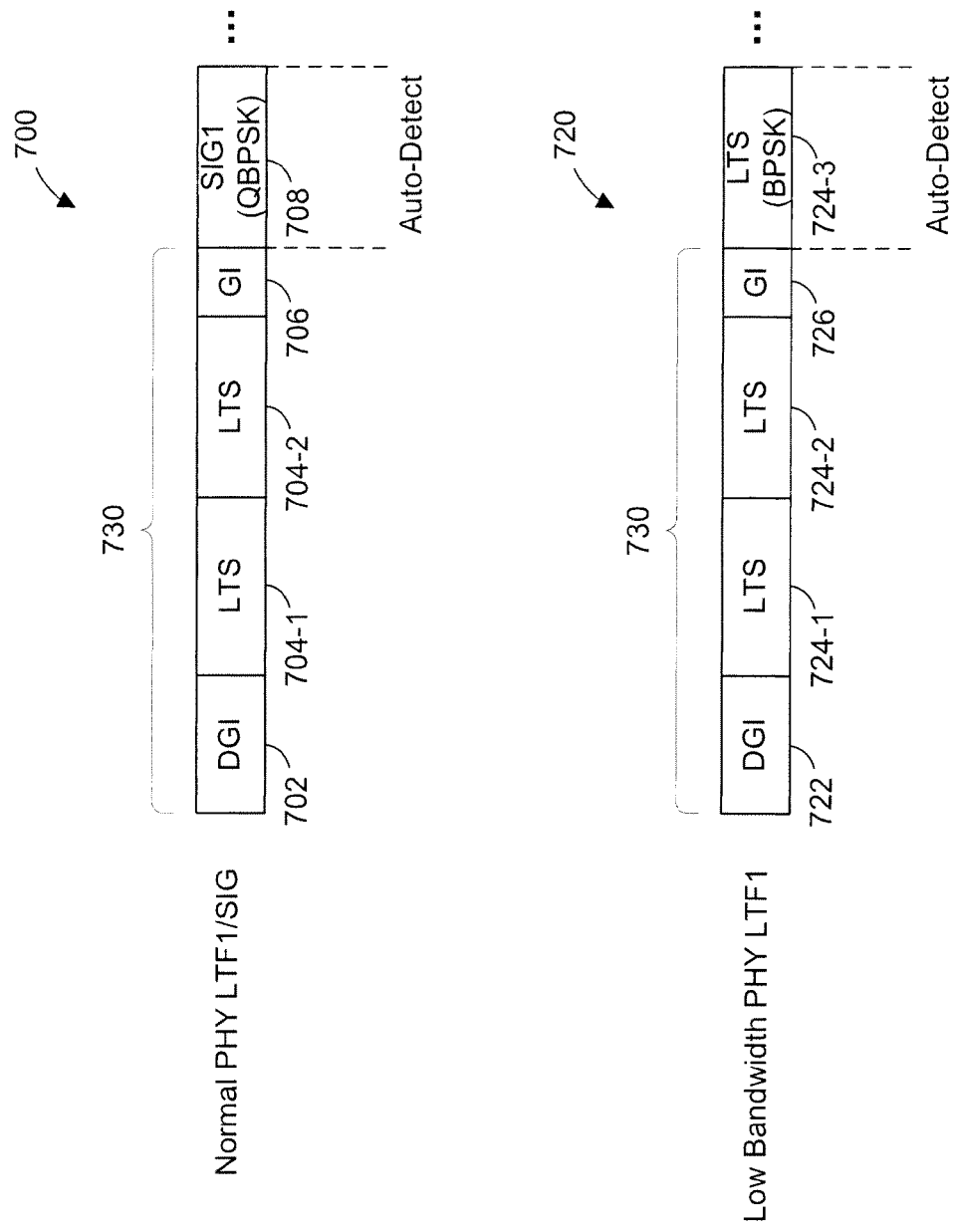
FIG. 12 is a diagram of an example second preamble portion of a normal mode data unit and an example second preamble portion of a low bandwidth mode data unit, according to an embodiment.

FIG. 12 is a diagram of an example second preamble portion 700 of a normal mode data unit and an example second preamble portion 720 of a low bandwidth mode data unit, according to an embodiment. In one embodiment, the second preamble portion 700 corresponds to LTF1 504 and SIG1 506-1 of the normal mode data unit 500 in FIG. 8, and the second preamble portion 720 corresponds to at least a portion of LTF1 544 of the low bandwidth mode data unit 540 in FIG. 9. In various embodiments, the second preamble portion 700 is included in the same preamble as any one of the normal mode STFs discussed above with reference to FIGS. 10 and 11, and the second preamble portion 720 is included in the same preamble as any corresponding one of the low bandwidth mode STFs discussed above with reference to FIGS. 10 and 11. For example, in one embodiment, the second preamble portion 700 follows the STF 600 of FIG. 10 and the second preamble portion 720 follows the STF 610 of FIG. 10.

Figure 13:
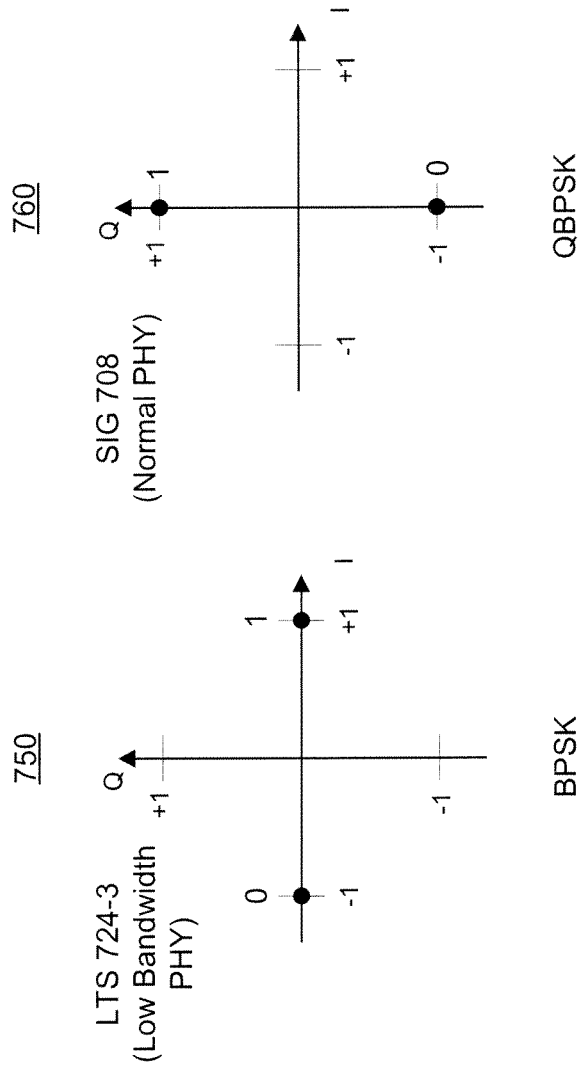
FIG. 13 is a diagram illustrating example modulation techniques used to modulate symbols within fields of a preamble, according to an embodiment.

The second preamble portion 700 includes a double guard interval (DGI) 702, two long training symbols (LTS) 704 in a first long training field (LTF1), a guard interval (GI) 706, and a first signal field (SIG1) 708. The first OFDM symbol of the SIG1 field 708 begins a time interval 730 after the beginning of LTF1 (i.e., the beginning of DGI 702 within LTF1). The second preamble portion 720 similarly includes DGI 722, two LTS 724 in LTF1, and a guard interval (GI) 726. The LTF1 of the second preamble portion 720, however, includes a greater number of long training symbols than the second preamble portion 700 of the normal mode data unit. For example, LTF1 of the second preamble portion 720 includes four long training symbols, in an embodiment. In one embodiment, each long training symbol after LTS 724-2 is preceded by a guard interval. For example, as seen in the example embodiment of FIG. 12, the guard interval 726 separates the third and fourth LTSs 724-2 and 724-3, respectively. By including guard interval 726, the location of the third LTS 724-3 relative to the beginning of LTF1 of preamble portion 720 is the same as the location of the SIG1 field 708 relative to the beginning of LTF1 of preamble portion 700 (i.e., each begins a time interval 730 after the beginning of the corresponding LTF1). Moreover, the SIG1 field 708 is modulated with a different modulation technique than the third LTS 724-3, in an embodiment. For example, the SIG1 field 708 is quaternary binary phase shift key (QBPSK) modulated and the third LTS 724-3 is binary phase shift key (BPSK) modulated, or vice versa, in various embodiments. Thus, a receiving device that synchronizes with a received data unit prior to the SIG1 field 708 or third LTS 724-3 can detect the modulation technique being used at the location of SIG1 (if a normal mode data unit) or the third LTS (if a low bandwidth mode data unit), and determine the PHY mode accordingly. FIG. 13 illustrates the BPSK modulation constellation 750 and the QBPSK modulation constellation 760. As seen in FIG. 13, the set of two constellation symbols for QBPSK is rotated by 90 degrees with respect to the set of two constellation symbols for BPSK.

Figure 14:
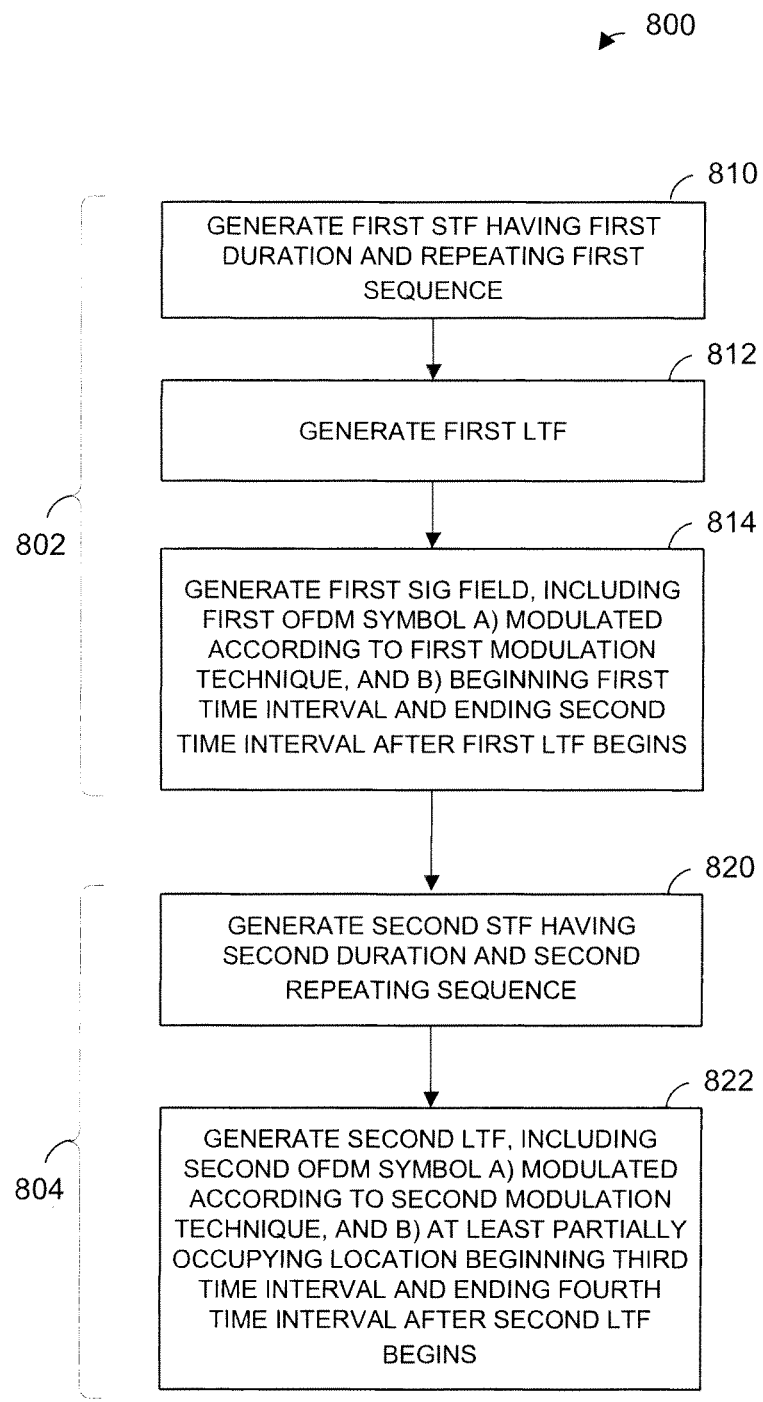
FIG. 14 is a flow diagram of an example method for generating a first preamble for a first data unit corresponding to a first PHY mode and a second preamble for a second data unit corresponding to a second PHY mode, according to an embodiment.

FIG. 14 is a flow diagram of an example method 800 for generating a first preamble for a first data unit corresponding to a first PHY mode and a second preamble for a second data unit corresponding to a second PHY mode different than the first PHY mode, according to an embodiment. In an embodiment, the first PHY mode is a normal mode of a long range communication protocol and the second PHY mode is a low bandwidth mode of the long range communication protocol. For example, in one embodiment, the second PHY mode is a control mode. Alternatively, the second PHY mode simply provides range extension beyond the first PHY mode. The method 800 is implemented by the network interface 16 of AP 14 and/or the network interface 27 of client station 25-1 of FIG. 1, in various embodiments.

Generally, a first data unit corresponding to the first PHY mode is generated at blocks 802 of FIG. 14, and a second data unit corresponding to the second PHY mode is generated at blocks 804 of FIG. 14. First with reference to blocks 802, an STF of the first data unit is generated at block 810. An LTF that follows the STF is generated at block 812, and a SIG field that follows the LTF is generated at block 814. In some embodiments, the preamble generated at blocks 802 also includes additional fields (e.g., additional LTFs, SIG fields, etc.). The STF generated at block 810 includes a repeating first sequence. The STF is similar to the STF 600 of FIG. 10, or the STF 650 of FIG. 11, in various embodiments. In an embodiment, the LTF generated at block 812 includes multiple OFDM symbols (e.g., two OFDM symbols). The SIG field generated at block 814 provides information for interpreting the first data unit, such as signal bandwidth, modulation type, and/or coding rate, for example. Moreover, the SIG field includes a first OFDM symbol that is modulated according to a first modulation technique to indicate to a receiver that the first data unit corresponds to the first PHY mode. The first OFDM symbol begins a time interval $T_1$, and ends a time interval $T_2$, after the LTF generated at block 812 begins.

Referring next to blocks 804, an STF of the second data unit is generated at block 820, and an LTF that follows the STF is generated at block 822. In some embodiments, the preamble generated at blocks 804 also includes additional fields (e.g., additional LTFs, SIG fields, etc.). The STF has a duration greater than the duration of the STF generated at block 810, and includes a repeating second sequence different than the repeating first sequence in the STF generated at block 810. Moreover, the period of the repeating second sequence is equal to the period of the repeating first sequence. The LTF generated at block 822 includes a second OFDM symbol modulated according to a second modulation technique different than the first modulation technique used to modulate the first OFDM symbol of the SIG field generated at block 814. The second modulation technique indicates to a receiver that the second data unit corresponds to the second PHY mode. In an embodiment, the first modulation technique of the method 800 is one of BPSK modulation and QBPSK modulation, and the second modulation technique of the method 800 is the other of BPSK modulation and QBPSK modulation. The second data unit LTF generated at block 822 includes more long training symbols (OFDM symbols) than the first data unit LTF generated at block 812. In one embodiment where the first data unit LTF includes two OFDM symbols, for example, the second data unit LTF includes four OFDM symbols. The second OFDM symbol at least partially occupies a location in the second preamble that begins the time interval $T_1$ after, and ends the time interval $T_2$ after, the LTF generated at block 822 begins. In one embodiment, the second OFDM symbol begins the time interval $T_1$ after, and ends the time interval $T_2$ after, the LTF generated at block 822 begins. In some embodiments, the second OFDM symbol is the long training symbol 724-3 in preamble portion 720 of FIG. 12 (i.e. a long training symbol that follows two earlier long training symbols in the LTF). By coordinating the timing of the first OFDM symbol within the first data unit preamble (e.g., relative to the start of the LTF of the first data unit preamble) and similarly coordinating the timing of the second OFDM symbol within the second data unit preamble (e.g., relative to the start of the LTF of the second data unit preamble), a receiving device with a priori knowledge of the timing can detect the modulation type used during the relevant time period to determine the PHY mode of a received data unit.

In some embodiments, the first OFDM symbol of the SIG field generated at block 814 is immediately preceded by a guard interval. e.g., as in the preamble portion 700 illustrated in FIG. 12, and the second OFDM symbol of the LTF field generated at block 822 is immediately preceded by another guard interval, e.g., as in the preamble portion 720 illustrated in FIG. 12. In one such embodiment, the two guard intervals have the same duration.

In some embodiments, the method 800 further includes (within the blocks 802 for generating the first preamble) generating a second SIG field following the SIG field generated at block 814. The second SIG field includes a third OFDM symbol modulated according to either a third modulation technique to indicate to a receiver that the first data unit is a single-user data unit, or a fourth modulation technique different than the third modulation technique to indicate to a receiver that the first data unit is a multi-user data unit. In one embodiment, the third modulation technique is one of BPSK and QBPSK, and the fourth modulation technique is the other of BPSK and QBPSK.

Figure 15:
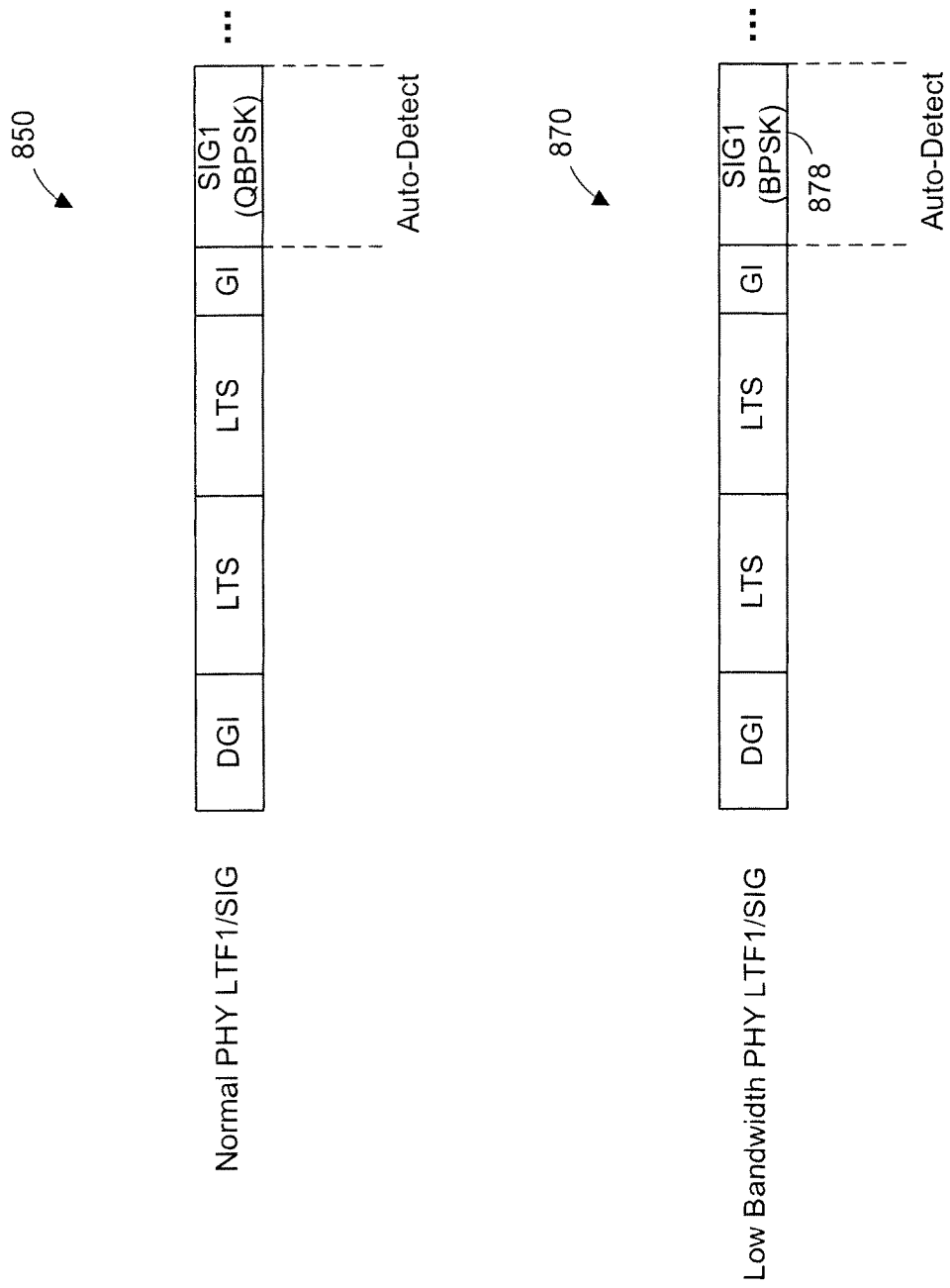
FIG. 15 is a diagram of another example second preamble portion of a normal mode data unit and another example second preamble portion of a low bandwidth mode data unit, according to an embodiment.

FIG. 15 is a diagram of another example second preamble portion 850 of a normal mode data unit and another example second preamble portion 870 of a low bandwidth mode data unit, according to an embodiment. The second preamble portions 850, 870 are the same as the second preamble portions 700, 730 of FIG. 12, in an embodiment, except that the third long training OFDM symbol 724-3 of low bandwidth mode preamble portion 720 is replaced by a SIG field 878. Thus, the PHY mode is indicated by the modulation technique (e.g., QBPSK or BPSK) in the first SIG field, regardless of whether the received data unit is a normal mode or low bandwidth mode data unit.

Figure 16:
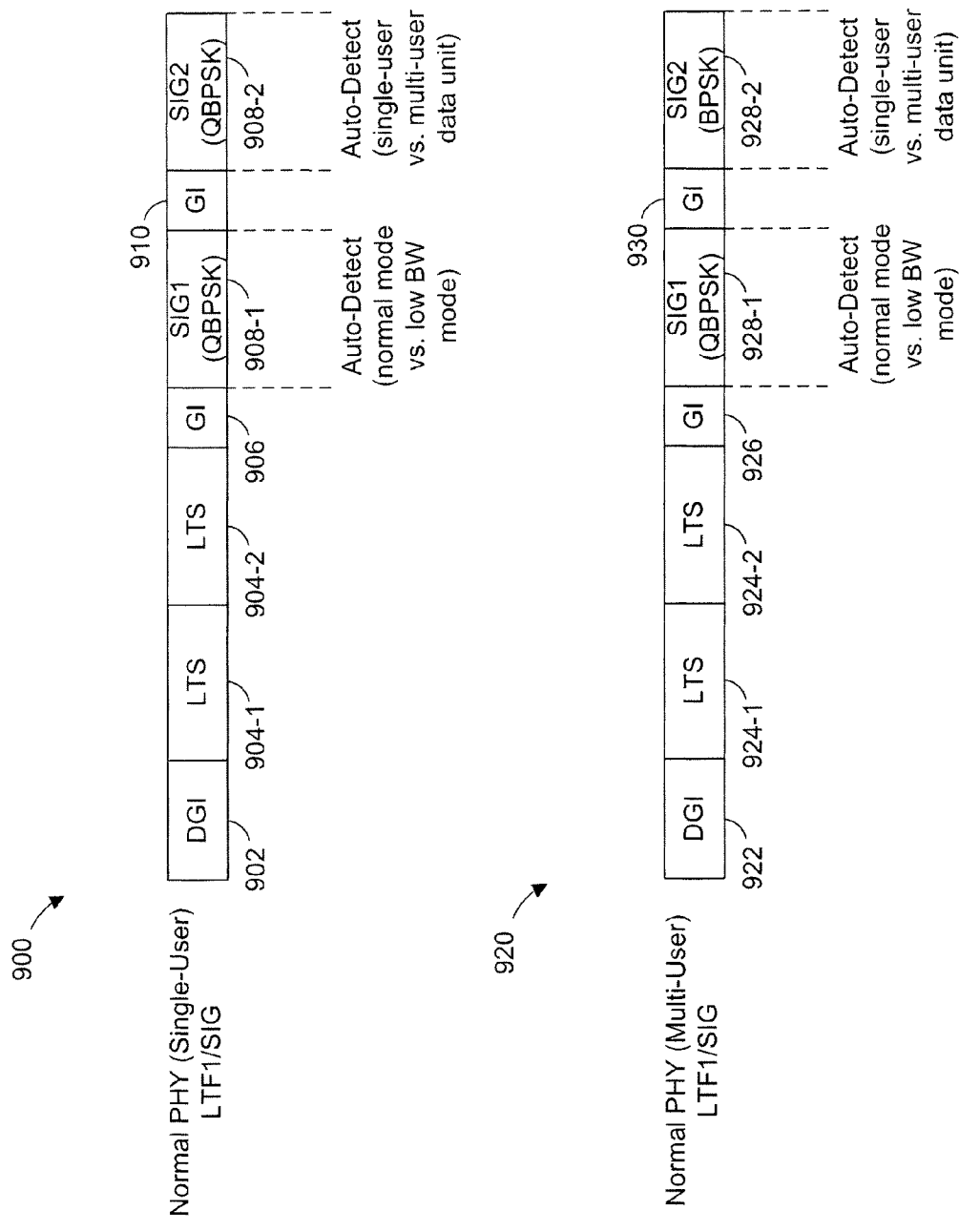
FIG. 16 is a diagram of example second preamble portions of single-user and multi-user normal mode data units, according to an embodiment.

FIG. 16 is a diagram of an example second preamble portion 900 of a normal mode, single-user data unit and an example second preamble portion 920 of a normal mode, multi-user data unit, according to an embodiment. In one embodiment, the second preamble portions 900, 920 each correspond to LTF1 504, SIG1 506-1, and SIG2 506-2 of the normal mode data unit 500 in FIG. 8. In various embodiments, the second preamble portions 900, 920 are each included in the same preamble as any one of the normal mode STFs discussed above with reference to FIGS. 10 and 11. For example, in one embodiment, the second preamble portion 900 or 920 (depending on whether the data unit is single- or multi-user) follows the STF 600 of FIG. 10.

The second preamble portion 900 of the normal mode, single-user data unit includes a double guard interval 902, long training symbols 904, guard interval 906, and first SIG field 908-1 similar to the double guard interval 702, long training symbols 704, guard interval 706, and first SIG field 708, respectively, of the second preamble portion 700 in FIG. 12, in an embodiment. As with the second preamble portion 700 in FIG. 12, the modulation type of the first SIG field 908-1 indicates to a receiver the PHY mode of the data unit (i.e. in the embodiment shown. QBPSK modulation is used to indicate a normal mode data unit). The second preamble portion 900 additionally includes a second guard interval 910 following the First SIG field 908-1, and a second SIG field 908-2 following the guard interval 910. The second SIG field 908-2 is modulated using a modulation technique that indicates whether the data unit with preamble portion 900 is a single-user or multi-user data unit. In the example embodiment shown in FIG. 16, the second SIG field 908-2 is QBPSK-modulated to indicate that the preamble portion 900 is a single-user data unit.

The second preamble portion 920 of the normal mode, multi-user data unit similarly includes a double guard interval 922, long training symbols 924, guard interval 926, and first SIG field 928-1. Again, the modulation type of the first SIG field 928-1 is used to indicate the PHY mode of the data unit (i.e., in the embodiment shown, QBPSK modulation is used to indicate a normal mode data unit), and the modulation type of the second SIG field 928-2 is used to indicate whether the data unit with preamble portion 920 is a single-user or multi-user data unit. In the example embodiment shown in FIG. 16, the second SIG field 928-2 is BPSK-modulated to indicate that the preamble portion 920 is a multi-user data unit. In other embodiments, BPSK modulation in the second SIG field indicates a single-user data unit and QBPSK modulation in the second SIG field indicates a multi-user data unit. In still other embodiments, any other suitable modulation techniques are used in the second SIG field to distinguish single-user and multi-user data units.

In an alternative embodiment, the modulation type of a SIG field after the second SIG field is used to indicate whether a data unit is single-user or multi-user. While only normal mode data units are shown in FIG. 16, both normal mode and low bandwidth mode data units can be either single-user or multi-user data units, in some embodiments. For example, in one embodiment, the modulation type of a first SIG field of a low bandwidth mode data unit is used to indicate whether a low bandwidth data unit is single-user or multi-user. As another example, in an embodiment where the modulation type of the first SIG field of a low bandwidth mode data unit is used to indicate PHY mode, the modulation type of a second SIG field is used to indicate whether the data unit is single-user or multi-user. In other embodiments, low bandwidth mode data units are not permitted to be multi-user data units.

In another embodiment, whether a data unit is single-user or multi-user is indicated to a receiver by a special "SU/MU bit" in a SIG field of normal mode data units (and/or of low bandwidth mode data units, if permitted to be multi-user). The SU/MU bit is in the first SIG field (e.g. of two SIG fields) of the data unit, in an embodiment. In some of these embodiments, multi-user data units include an extended length multi-user STF (MUSTF) after the second SIG field, which provides a receiver with more time to adjust automatic gain control after decoding the SIG field of a multi-user data unit. In some embodiments, multi-user data units are so-called "long preamble data units" that use a preamble structure similar to the IEEE 802.11n mixed-mode preamble, and single-user data units are so-called "short preamble data units" that use a (shorter) preamble similar to the IEEE 802.11n Greenfield preamble.

Figure 17:
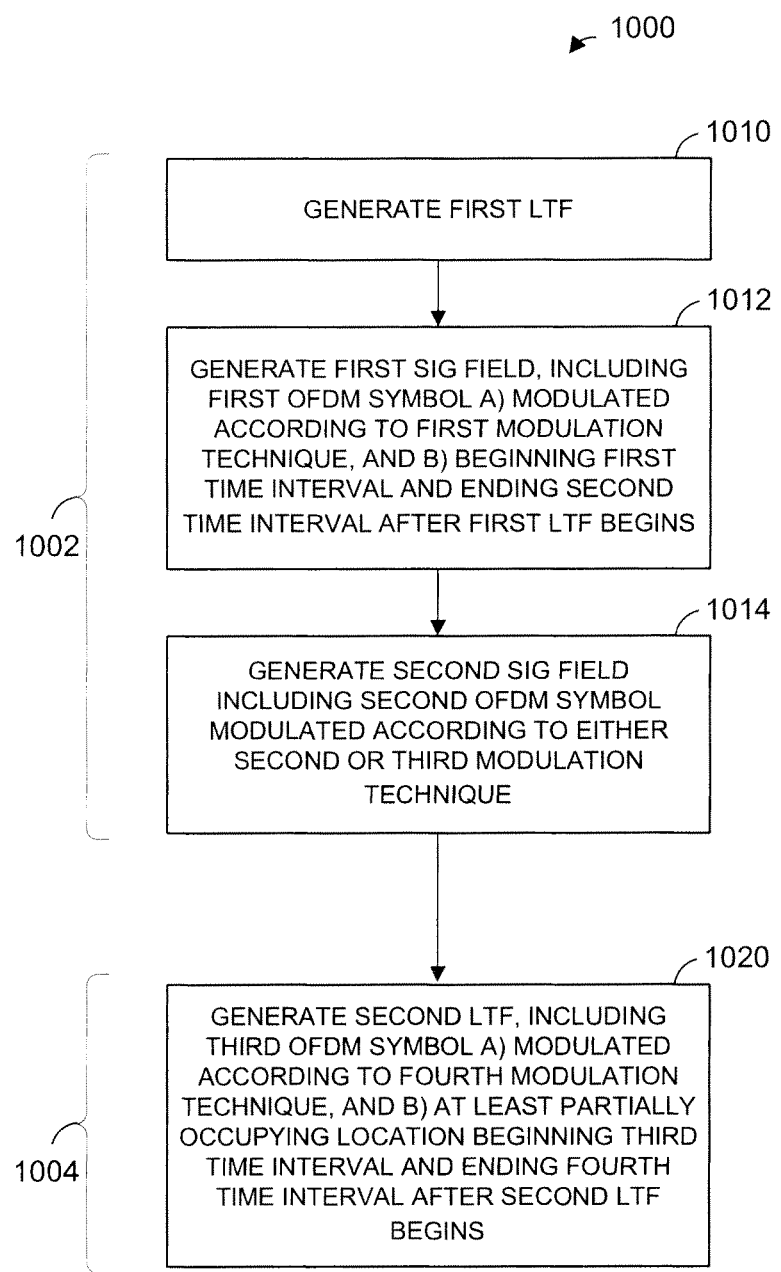
FIG. 17 is a flow diagram of another example method for generating a first preamble for a first data unit corresponding to a first PHY mode and a second preamble for a second data unit corresponding to a second PHY mode, according to an embodiment.

FIG. 17 is a flow diagram of an example method 1000 for generating a first preamble for a first data unit corresponding to a first PHY mode and a second preamble for a second data unit corresponding to a second PHY mode different than the first PHY mode, according to an embodiment. In an embodiment, the first PHY mode is a normal mode of a long range communication protocol and the second PHY mode is a low bandwidth mode of the long range communication protocol. For example, in one embodiment, the second PHY mode is a control mode. Alternatively, the second PHY mode simply provides range extension beyond the first PHY mode. The method 1000 is implemented by the network interface 16 of AP 14 and/or the network interface 27 of client station 25-1 of FIG. 1, in various embodiments.

Generally, a first data unit corresponding to the first PHY mode is generated at method portion 1002 and a second data unit corresponding to the second PHY mode is generated at method portion 1004. First with reference to method portion 1002, an LTF of the first data unit is generated at block 1010. A first SIG field that follows the LTF is generated at block 1012, and a second SIG field that follows the first SIG field is generated at block 1014. In some embodiments, the preamble generated at blocks 1002 also includes additional fields (e.g. an STF, additional LTFs, additional SIG fields, etc.). In an embodiment, the LTF generated at block 1010 includes multiple OFDM symbols (e.g., two OFDM symbols). The first and second SIG fields generated at blocks 1012 and 1014, respectively, each provide information for interpreting the first data unit, such as signal bandwidth, modulation type, and/or coding rate, for example. The first SIG field includes a first OFDM symbol that is modulated according to a first modulation technique to indicate to a receiver that the first data unit corresponds to the first PHY mode. The first OFDM symbol begins a time interval $T_1$, and ends a time interval after the LTF generated at block 1010 begins. The second SIG field includes a second OFDM symbol that is modulated according to either a second modulation technique to indicate to a receiver that the first data unit is a single-user data unit, or a third modulation technique different than the second modulation technique to indicate to a receiver that the first data unit is a multi-user data unit.

Referring next to method portion 1004, an LTF of the second data unit is generated at block 1020. In some embodiments, the preamble generated at method portion 1004 also includes additional fields (e.g. an STF, additional LTFs, SIG fields, etc.). The LTF includes a third OFDM symbol modulated according to a fourth modulation technique different than the first modulation technique used to modulate the first OFDM symbol of the SIG field generated at block 1014. The fourth modulation technique indicates to a receiver that the second data unit corresponds to the second PHY mode. The third OFDM symbol at least partially occupies a location in the second preamble that begins the time interval $T_1$ after, and ends the time interval $T_2$ after, the LTF generated at block 1020 begins. In one embodiment, the third OFDM symbol begins the time interval $T_1$ after, and ends the time interval $T_2$ after, the LTF generated at block 1020 begins. Similar to the method 800 of FIG. 14, coordinating the timing of the third OFDM symbol within the first data unit preamble (e.g., relative to the start of the LTF of the first data unit preamble) and similarly coordinating the timing of the third OFDM symbol within the second data unit preamble (e.g., relative to the start of the LTF of the second data unit preamble) allows a receiving device with a priori knowledge of the timing to detect the modulation type and determine the PHY mode of a received data unit.

In an embodiment, the first modulation technique of the method 1000 is one of BPSK modulation and QBPSK modulation, and the fourth modulation technique of the method 1000 is the other of BPSK modulation and QBPSK modulation. Moreover, in an embodiment, the second modulation technique of the method 1000 is one of BPSK modulation and QBPSK modulation, and the third modulation technique of the method 1000 is the other of BPSK modulation and QBPSK modulation.

The long training symbols (LTSs) of the second preamble portions described above with reference to FIGS. 12-17 are defined in various ways according to different embodiments. In one embodiment, each LTS in LTF1 544 is as defined in the IEEE 802.11n Standard, i.e., with +1 or −1 in an arbitrary order. Moreover, in an embodiment, the tones of the normal mode (e.g. 64-point IDFT) LTS have the same values as the corresponding tones that would result if the low bandwidth mode (e.g., 32-point IDFT) LTS were replicated in each of the lower and upper sidebands of the 64-point IDFT. In this embodiment, the remaining tones not occupied by the replicated 32-point IDFT tones (e.g., four extra tones, if the normal mode LTS has 56 data/pilot tones and the low bandwidth mode LTS has 26 data/pilot tones) are tilled in with other suitable values. This design provides convenience of frequency domain auto-detection (which is always performed in the 32-point IDFT half-band, even if the signal is a 64-point or greater IDFT signal, in an embodiment). In some embodiments, to reduce PAPR, the normal mode signal includes a phase shift (e.g., 90 degrees) across all tones in the upper sideband of the LTS or across all tones in the lower sideband of the LTS. Moreover, if any tone re-routing is utilized as a result of low bandwidth mode signals being duplicated in the frequency domain across the normal mode channel bandwidth (as described below with reference to FIGS. 22, and 23), the corresponding LTS tones are adjusted in a like manner.

In some embodiments, communication channels of a WLAN (e.g., WLAN 10 of FIG. 1) are defined based on normal mode signal bandwidths only, whereas low bandwidth mode signals (e.g., control mode signals, in an embodiment) are transmitted in one or more frequency bands within those communication channels. For example, the channelization on which medium access control (MAC) protocols operate corresponds to the set of channels used to transmit normal mode signals, in an embodiment. In a more specific example embodiment, where normal mode signals are transmitted in 2 MHz, 4 MHz, 8 MHz, or 16 MHz bandwidths (e.g. corresponding to data units generated using 64-point, 128-point, 256-point, or 512-point IDFTs), the defined channels are 2 MHz, 4 MHz, 8 MHz, or 16 MHz channels, and a low bandwidth mode signal having a 1 MHz bandwidth (e.g., corresponding to a data unit generated using a 32-point IDFT) is transmitted in a 1 MHz band within one of the 2 MHz channels. In the discussions below referring to FIGS. 18-23, tbr ease of explanation and unless otherwise indicated, normal mode data units will be assumed to be data units generated using a 64-point IDFT as a minimum IDFT size, corresponding to a minimum 2 MHz channel bandwidth. In other embodiments, however, the minimum IDFT size and/or bandwidth may be another suitable value, with various other system parameters (e.g., the low bandwidth mode bandwidth and IDFT size) being scaled or otherwise modified accordingly.

Various placements of the frequency band for low bandwidth mode signals within normal mode channels are described below with reference to FIGS. 18-21. In each of FIGS. 18-21, the channels 1100 are used to transmit normal mode data units. Each channel 1100 has a bandwidth equal to the 2 MHz minimum bandwidth of normal mode signals, in an embodiment. While three channels 1100 are shown in each of FIGS. 18-21, one, two, tour, or greater than four channels 1100 are utilized in other embodiments. Moreover, in some embodiments, two or more of the channels 1100 can be combined to form a composite channel (e.g., 4 MHz, 8 MHz, etc.), subject to any combination criteria or rules. While frequency band placement is shown with respect to the second channel 1100-2 in FIGS. 18-21, other scenarios may involve placement within channel 1100-1, 1100-3, or any other suitable channel 1100.

Figure 18:
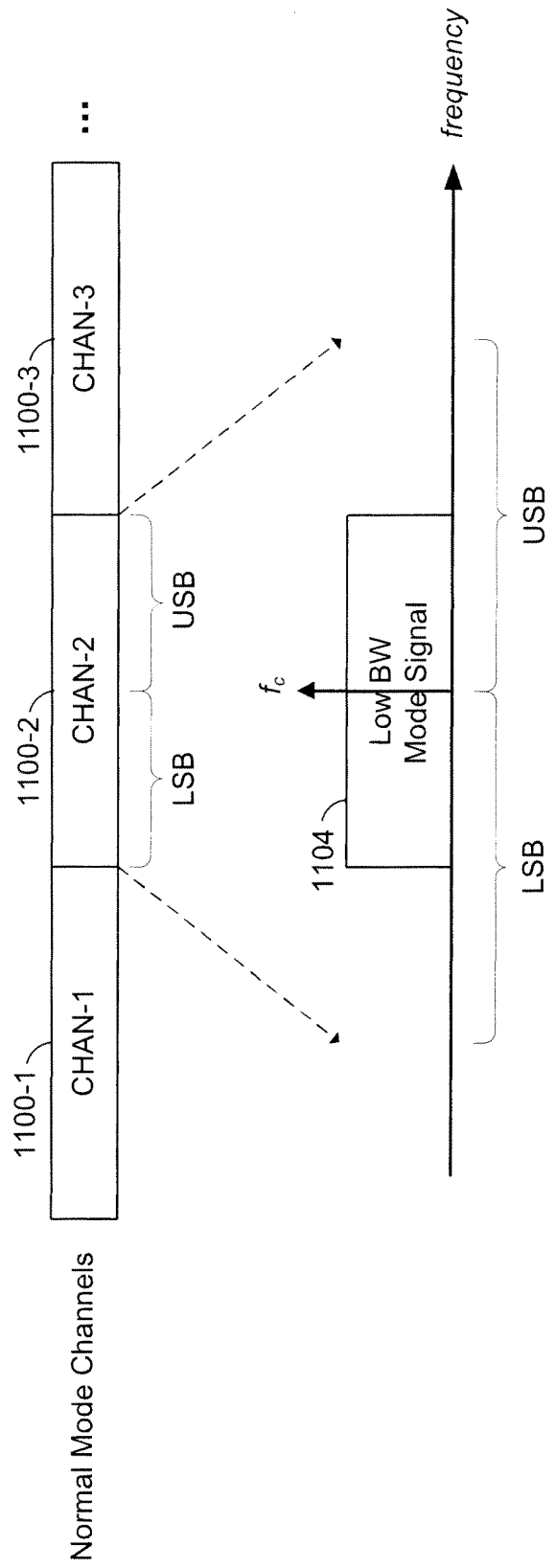
FIG. 18 is a diagram of an example placement of a frequency band used to transmit a low bandwidth mode data unit within a communication channel used to transmit a normal mode data unit, according to an embodiment.

FIG. 18 is a diagram of an example placement of a frequency band used to transmit a low bandwidth mode signal 1104 within the communication channel 1100-2, according to an embodiment. In one embodiment, the low bandwidth mode signal 1104 is a 1 MHz wide, 32-point IDFT signal (or a 64-point IDFT signal with the appropriate tones zeroed out) that includes OFDM symbols having the tone map 450 of FIG. 7A (e.g. in the data, SIG, and/or LTF portions of the data units). In another embodiment, the low bandwidth mode signal 1104 is a 0.5 MHz wide, 16-point IDFT signal (or a 64-point IDFT signal with the appropriate tones zeroed out) that includes OFDM symbols having the tone map 470 of FIG. 7B. In still other embodiments, the low bandwidth mode signal 1104 is generated using another suitable IDFT size and occupies another suitable bandwidth less than 2 MHz.

In the embodiment and scenario shown in FIG. 18, the low bandwidth mode signal 1104 is transmitted in a frequency band that is fixed at the center of channel 1100-2. More generally, in an embodiment, MAC layer operations (e.g., implemented by MAC processing unit 18 and/or MAC processing unit 28 of FIG. 1, in various embodiments) require that the low bandwidth mode signal 1104 be transmitted in a frequency band centered within any one of communication channels 1100. By centering the band within one of channels 1100, interference with other channels 1100 is generally reduced.

Figure 19:
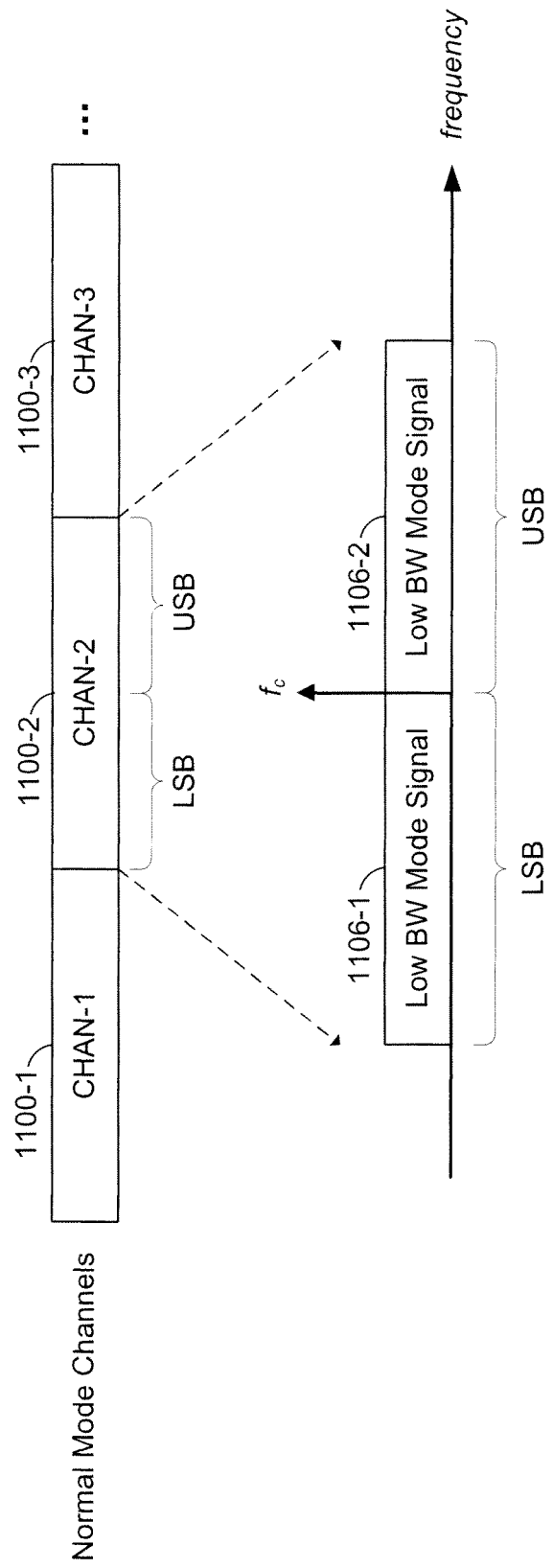
FIG. 19 is a diagram of another example placement of a frequency band used to transmit a low bandwidth mode data unit within a communication channel used to transmit a normal mode data unit, according to an embodiment.

FIG. 19 is a diagram of another example placement of a frequency band used to transmit a low bandwidth mode signal 1106 within the communication channel 1100-2, according to an embodiment. The signal 1106-1 is transmitted in a frequency band corresponding to the lower sideband of channel 1100-2, and a duplicate of signal 1106-1 (i.e., signal 1106-2) is simultaneously transmitted in a frequency band corresponding to the upper sideband of channel 1100-2. In an embodiment, each low bandwidth mode signal 1106 is a 1 MHz wide signal that includes OFDM symbols having the tone map 450 of FIG. 7A (e.g., in the data. SIG, and/or LTF portions of the data units). In various embodiments, the combination of signals 1106-1 and 1106-2 is generated using two 32-point IDFTs, or using one 64-point IDFT. In an embodiment where the signal includes OFDM symbols having the tone map 450 of FIG. 7A, three guard tones are included at the lower edge of channel 1100-2, while only two guard tones are included at the upper edge of channel 1100-2. In another embodiment, each low bandwidth mode signal 1106 is instead a 0.5 MHz wide signal that includes OFDM symbols having the tone map 470 of FIG. 7B, and four copies of the signal 1106 are transmitted within channel 1100-2. In various embodiments, the combination of four signals 1106 is generated using four 16-point IDFTs, or using one 64-point IDFT. In yet another embodiment, each low bandwidth mode signal 1106 is a 0.5 MHz wide signal that includes OFDM symbols having the tone map 470 of FIG. 7B, and only two copies of the signal 1106 are transmitted within channel 1100-2. In one such embodiment, the two copies of the 0.5 MHz signal are located within a centered 1 MHz band within the channel 1100-2, to minimize interference with other channels.

Generally, embodiments that include duplication of the low bandwidth mode signal 1106 in multiple frequency bands provide frequency diversity. For example, a receiving device can perform frequency domain combining/averaging of the duplicated signals 1106. Moreover, phase shifts are applied across duplicates of the low bandwidth mode signal 1106, in some embodiment (e.g. [1 −1 −1 −1] for 4× frequency duplication, or [1 j] for 2× frequency duplication) to reduce PAPR.

Figure 20:
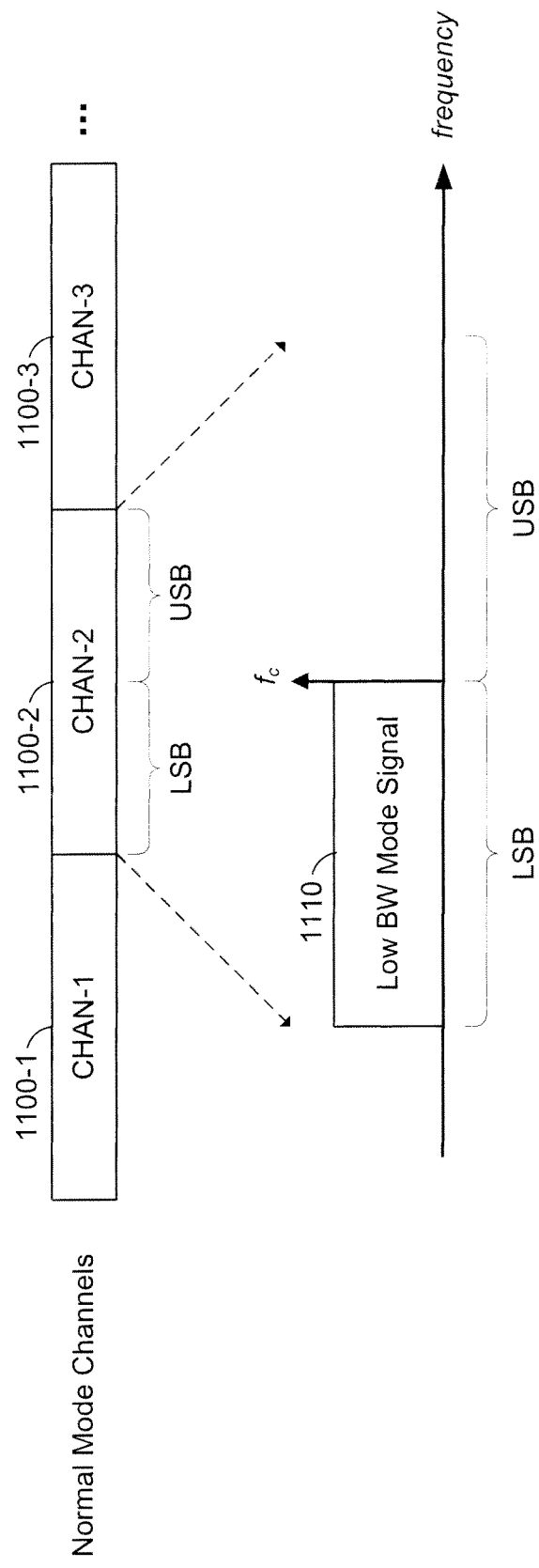
FIG. 20 is a diagram of another example placement of a frequency band used to transmit a low bandwidth mode data unit within a communication channel used to transmit a normal mode data unit, according to an embodiment.

FIG. 20 is a diagram of another example placement of a frequency band used to transmit a low bandwidth mode signal 1110 within the communication channel 1100-2, according to an embodiment. In one embodiment, the low bandwidth mode signal 1110 is a 1 MHz wide, 32-point IDFT signal (or a 64-point IDFT signal with the appropriate tones zeroed out) that includes OFDM symbols having the tone map 450 of FIG. 7A (e.g., in the data, SIG, and/or LTF portions of the data units). In the embodiment and scenario shown in FIG. 20, the low bandwidth mode signal 1110 is transmitted in a frequency band that is fixed in the lower sideband of channel 1100-2. More generally, in an embodiment in which the low bandwidth mode signal 1110 includes OFDM symbols having more lower-edge guard tones than upper-edge guard tones (e.g., the tone map 450 of FIG. 7A). MAC layer operations (e.g., implemented by MAC processing unit 18 and/or MAC processing unit 28 of FIG. 1, in various embodiments) do not permit the low bandwidth mode signal 1110 to be transmitted in an upper sideband of any of communication channels 1100. In this manner, interference with other channels may generally be reduced, and the filter design requirement may also be relaxed. In other embodiments, where the low bandwidth mode signal 1110 tone map instead has more upper-edge guard tones than lower-edge guard tones, the MAC layer operations do not permit the low bandwidth mode signal 1110 to be transmitted within the lower sideband of any of communication channels 1100.

In some embodiments where the low bandwidth mode frequency band is restricted to a particular (lower or upper) sideband of a normal mode channel, a receiver auto-detects the PHY mode based on the signal (or signal portion) detected in the frequency band, where the frequency band location is known a priori to the receiver. For example, in an embodiment, the receiver knows that a low bandwidth mode (e.g., control mode) signal will only be transmitted in a lower sideband of a normal mode channel. Accordingly, for purposes of auto-detecting the PHY mode (e.g., based on STF differences, etc.), the receiver only observes signals in the lower sideband of the channel, in this embodiment. Conversely, the receiver detects the bandwidth of different normal mode data units (e.g., 2 MHz, 4 MHz, 8 MHz, etc.) based on a signal field (e.g., an HTSIG field as used in IEEE 802.11n and IEEE 802.11ac), in an embodiment.

Figure 21:
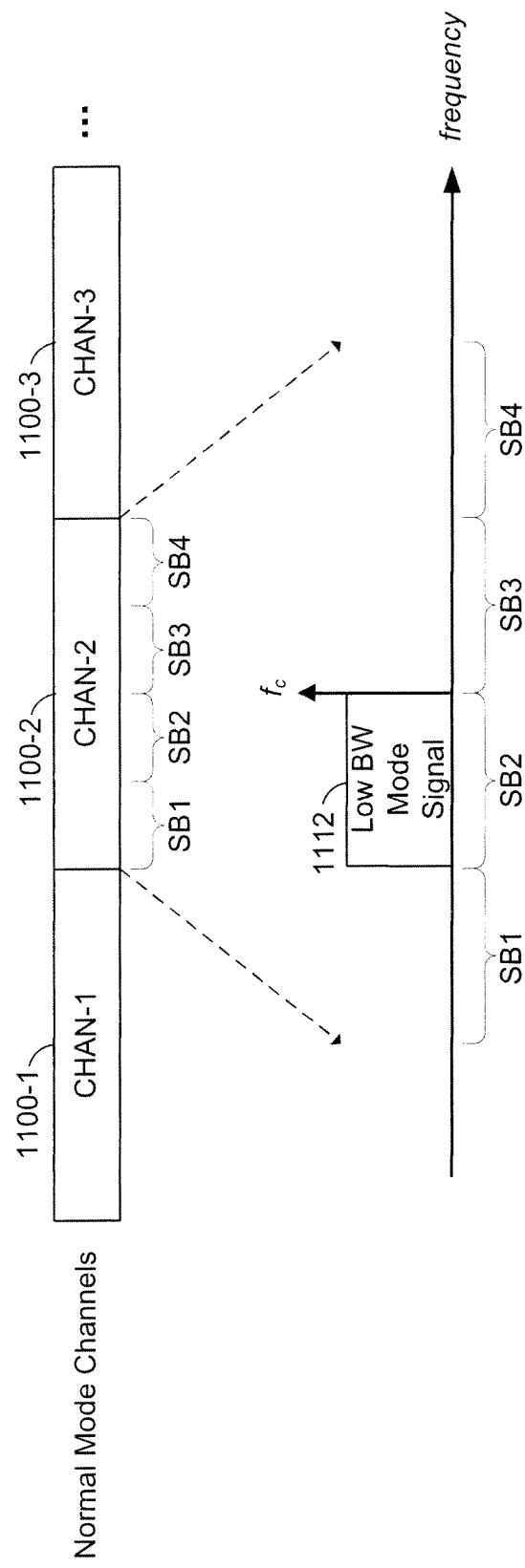
FIG. 21 is a diagram of another example placement of a frequency band used to transmit a low bandwidth mode data unit within a communication channel used to transmit a normal mode data unit, according to an embodiment.

FIG. 21 is a diagram of yet another example placement of a frequency band used to transmit a low bandwidth mode signal 1112 within the communication channel 1100-2, according to an embodiment. In one embodiment, the low bandwidth mode signal 1112 is a 0.5 MHz wide, 16-point IDFT signal (or a 64-point IDFT signal with the appropriate tones zeroed out) that includes OFDM symbols having the tone map 470 of FIG. 7B (e.g., in the data. SIG, and/or LTF portions of the data units). In the embodiment and scenario shown in FIG. 21, the low bandwidth mode signal 1112 is transmitted in a frequency band that is fixed in a second-lowest of four 0.5 MHz sub-bands within channel 1100-2. More generally, in an embodiment, MAC layer operations (e.g., implemented by MAC processing unit 18 and/or MAC processing unit 28 of FIG. 1, in various embodiments) do not permit the low bandwidth mode signal 1112 to be transmitted in an upper-most or a lower-most sub-band of any of communication channels 1100. In this manner, interference with other channels may generally be reduced.

In some of the embodiments described above with reference to FIGS. 18-21, a low bandwidth mode signal with an unbalanced number of guard tones (i.e., more guard tones at the upper/lower band edge than the lower/upper band edge, as in the example tone map 450 of FIG. 7A) may be transmitted in a frequency band that places the smaller number of guard tones at one edge of the communication channel 1100-2. For example, with reference to the frequency band placement shown in FIG. 19, and in an embodiment where both low bandwidth mode signals 1106-1 and 1106-2 use the tone map 450 of FIG. 7A, the low bandwidth mode signal 1106-2 provides only two guard tones at the upper edge of channel 1100-2 (as compared to the three guard tones that signal 1106-1 provides at the lower edge of channel 1100-2). As another example, if the low bandwidth mode signal 1110 in FIG. 20 were transmitted in a frequency band placed in the upper sideband of channel 1100-2 rather than the lower sideband (again, for the case where signal 1110 uses tone map 450 of FIG. 7A), the low bandwidth mode signal 1110 provides only two guard tones at the upper edge of channel 1100-2.

Figure 22A:
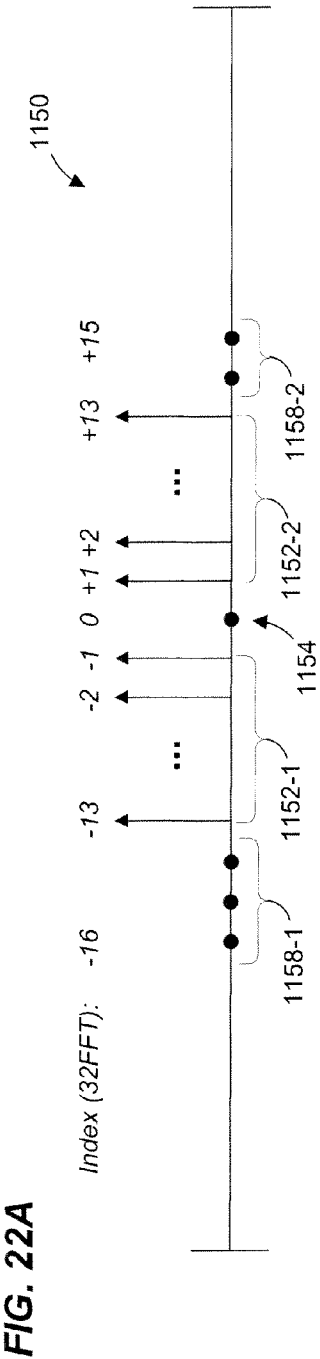
FIGS. 22A, 22B, and 22C are diagrams of example regular, reversed, and shifted tone maps, respectively, corresponding to low bandwidth mode data units, according to an embodiment.
Figure 22B:
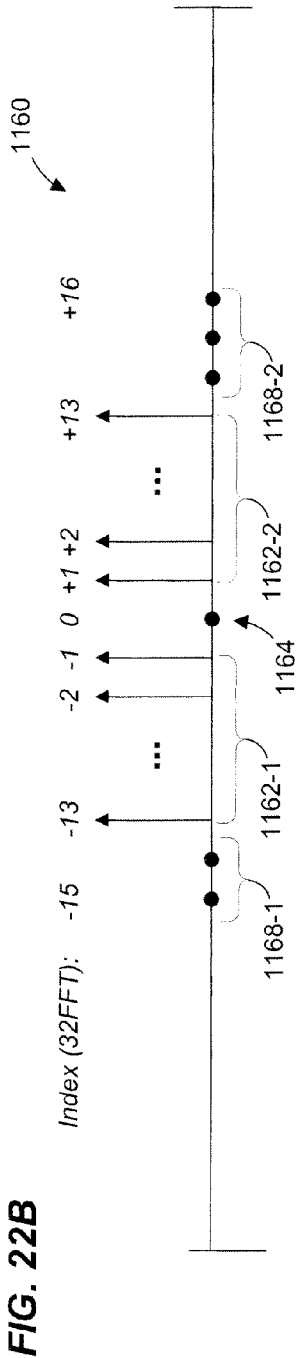
Figure 22C:
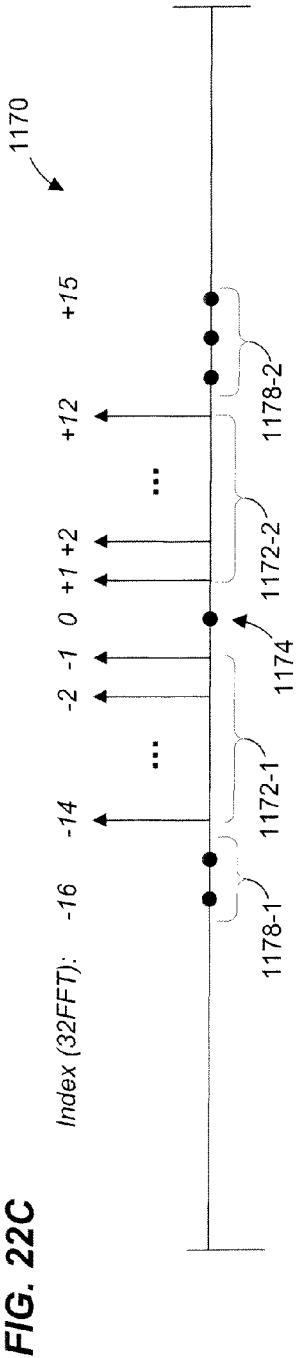

To increase the number of guard tones at the edge(s) of the channel 100-2, the tones of a low bandwidth mode signal (or of one or more frequency domain duplicates thereof) are in some embodiments reversed or shifted. FIGS. 22A-22C are diagrams of example regular, reversed, and shifted tone maps 1150, 1160, and 1170 each corresponding to low bandwidth mode signals, according to various embodiments. FIGS. 22A-22C correspond to regular and re-routed (reversed or shifted) tone maps for the case in which the regular tone map of low bandwidth mode signals is the tone map 450 of FIG. 7A. Thus, the "regular" tone map 1150, with data and pilot tones 1152. DC tone 1154, and guard tones 1158, is identical to the tone map 450 of FIG. 7A with data and pilot tones 452, DC tone 454, and guard tones 458.

Tone map 1160 includes a same number (as compared to regular tone map 1150) of data and pilot tones 1162, DC tone 1164, and guard tones 1168, but has two lower-edge guard tones 1168-1 and three upper edge-guard tones 1168-2 rather than vice versa. In this embodiment, the reversal of the number of guard tones at the band edges is achieved by reversing all non-zero tones of the map 1150, i.e., such that the tones at indices −1 to −13 in map 1150 are instead mapped to indices +1 to +13, respectively, in map 1160, and such that the tones at indices +1 to +13 in map 1150 are instead mapped to indices −1 to −13, respectively, in map 1160.

Tone map 1170 likewise includes a same number (as compared to regular tone map 1150) of data and pilot tones 1172, DC tone 1174, and guard tones 1178, but has two lower-edge guard tones 1178-1 and three upper edge-guard tones 1178-2. In this embodiment, the reversal of the number of guard tones is achieved by shifting all non-zero tones of the map 1150 one to the left (except for the tone at the +1 index, which is shifted two to the left to avoid the DC tone). Thus, the tone at index +1 in map 1150 is instead mapped to index −1 in map 1170, the tones at indices −1 to −13 in map 1150 are instead mapped to indices −2 to −14, respectively, in map 1170, and the tones at indices +2 to +13 in map 1150 are instead mapped to indices +1 to +12, respectively, in map 1170.

Figure 23A:
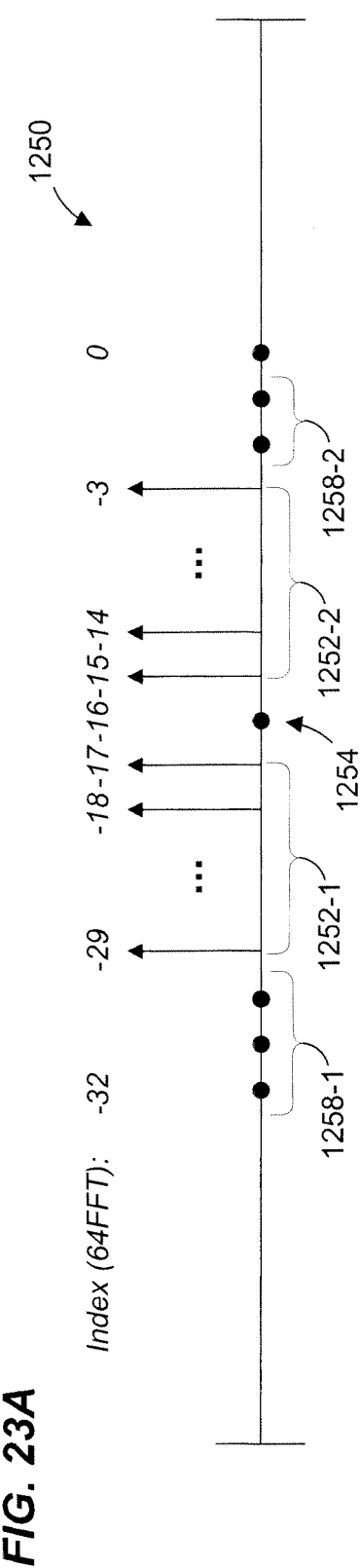
FIGS. 23A and 23B are diagrams of example regular and shifted tone maps, respectively, corresponding to low bandwidth mode data units, according to an embodiment.
Figure 23B:
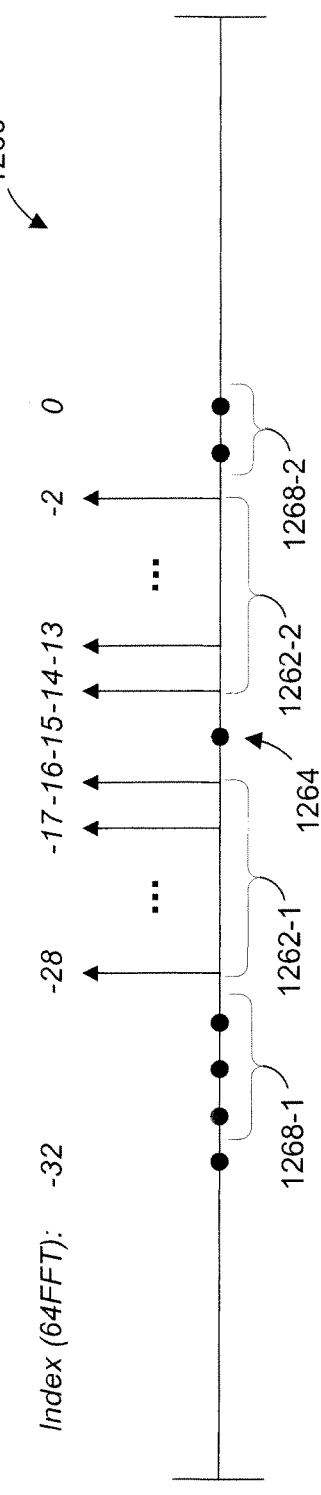

FIGS. 23A and 23B are diagrams of example regular and shifted tone maps 1250 and 1260, respectively, each corresponding to low bandwidth mode signals, according to an embodiment. Unlike the regular and shifted tone maps 1150 and 1170 of FIGS. 22A and 22C, however, the tone maps 1250 and 1260 correspond to an embodiment in which the low bandwidth mode signal is transmitted in a frequency band fixed in the lower sideband of the normal mode, 64-point IDFT signal channel (e.g., the embodiment of FIG. 20). Thus, the tone indices shown correspond to the −32 to 0 indices of the lower sideband of the 64-point IDFT signal channel rather than the −15 to +16 indices or −16 to +15 indices of the 32-point IDFT signal frequency band.

As with FIGS. 22A and 22C, the embodiments of FIGS. 23A and 23B correspond to regular and shifted tone maps for the case in which the regular tone map of low bandwidth mode signals is the tone map 450 of FIG. 7A. Thus, the "regular" tone map 1250, with data and pilot tones 1252, DC tone 1254, and guard tones 1258, is identical to the tone map 450 of FIG. 7A with data and pilot tones 452, DC tone 454, and guard tones 458, except that the map 1250 is aligned with the indices of the lower sideband of a 64-point IDFT signal channel.

Tone map 1260 includes a same number (as compared to regular tone map 1250) of data and pilot tones 1262, DC tone 1264, and guard tones 1268, but has four lower-edge guard tones 1268-1 rather than three. In this embodiment, the greater number of lower-edge guard tones is achieved by shifting all non-zero tones of the map 1250 one to the right, i.e., such that the tones at indices −3 to −15 in map 1250 are instead mapped to indices −2 to −15, respectively, in map 1260, and such that the tones at indices −17 to −29 in map 1250 are instead mapped to indices −16 to −28, respectively, in map 1260. In other embodiments, the tones of the regular tone map 1250 are instead shifted to the right by a different suitable number greater than one to provide even more lower-edge guard tones. In still other embodiments, for example where the low bandwidth mode signal is transmitted in a frequency band placed in the upper sideband of channel 1100-2 rather than the lower sideband, the tones are instead shifted to the left by one or more indices.

In some embodiments, tone re-routing (reversing and/or shifting) of low bandwidth mode signals (or one or more frequency-domain duplicates thereof) is utilized as in FIGS. 22A-22C or as in FIGS. 23A and 23B, but the tones of the STF portion of the low bandwidth mode signals (or duplicates) are unchanged, i.e., not reversed, shifted or otherwise re-routed. In this manner, the periodicity of the STF sequences is preserved.

Figure 24:
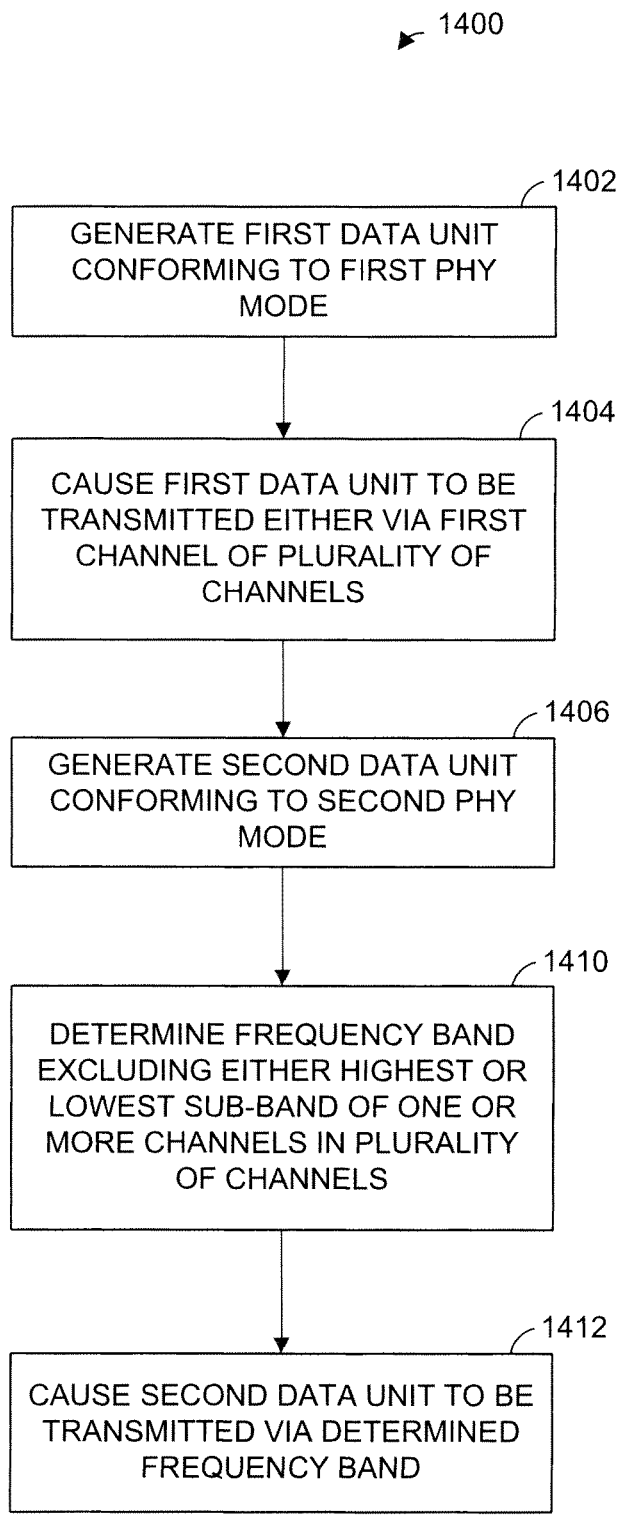
FIG. 24 is a flow diagram of an example method for generating and causing to be transmitted first and second data units conforming to first and second PHY modes, respectively, according to an embodiment.

FIG. 24 is a flow diagram of an example method 1400 for generating and causing to be transmitted first and second data units conforming to first and second PHY modes, respectively, according to an embodiment. In an embodiment, the first PHY mode is a normal mode of a long range communication protocol and the second PHY mode is a low bandwidth mode of the long range communication protocol. For example, in one embodiment, the second PHY mode is a control mode. Alternatively, the second PHY mode simply provides range extension beyond the first PHY mode. In some embodiments, the first PHY mode corresponds to a data throughput that is greater than a data throughput corresponding to the second PHY mode. The method 1400 is implemented in a communication system (e.g., WLAN 10 of FIG. 1) having a plurality of channels for transmitting data units conforming to the first (e.g., normal) PHY mode. In some embodiments, the communication system also utilizes additional, composite channels (formed by aggregating two or more channels of the plurality of channels) to transmit data units conforming to the first PHY mode. In an embodiment, the method 1400 is implemented by the network interface 16 of AP 14 and/or the network interface 27 of client station 25-1 of FIG. 1.

At block 1402, the first data unit conforming the first PHY mode is generated, at least in part by generating a first series of OFDM symbols. In one embodiment, the first series of OFDM symbols is generated at least in part by utilizing a 64-point IDFT. At block 1404, the first data unit generated at block 1402 is caused to be transmitted via a first channel of the plurality of channels. For example, in an embodiment, a PHY processing unit within a network interface implementing the method 1400 provides the OFDM signal corresponding to the first data unit to a radio frequency (RF) transmit chain.

At block 1406, a second data unit conforming to the second PHY mode is generated, at least in part by generating a second series of OFDM symbols. In one embodiment, at least a portion (e.g., a data portion, a data and SIG field portion, a data, LTF and SIG field portion, etc.) of the second series of OFDM symbols includes more upper-edge guard tones than lower-edge guard tones. In another embodiment, at least a portion of the second series of OFDM symbols includes more lower-edge guard tones than upper-edge guard tones. In one embodiment, the second series of OFDM symbols is generated at least in part by utilizing a 32-point IDFT. In another embodiment, the second series of OFDM symbols is generated at least in part by utilizing a 64-point IDFT with at least one half of the total number of generated tones set equal to zero. In an embodiment, the second series of OFDM symbols is generated using the same clock rate used to generate the first series of OFDM symbols.

At block 1410, a frequency band for transmitting the second data unit is determined. The frequency band has a bandwidth equal to the bandwidth of each channel of the plurality of channels, divided by an integer n greater than or equal to two. In one embodiment, the integer n is equal to two (e.g., each channel has a 2 MHz bandwidth, and the determined frequency band has a 1 MHz bandwidth). In an embodiment where the portion of the second series of OFDM symbols includes more upper-edge guard tones than lower-edge guard tones, determining the frequency band at block 1410 includes excluding a lowest sub-band of each of one or more channels in the plurality of channels (e.g. in all channels of the plurality of channels). Alternatively, in an embodiment where the portion of the second series of OFDM symbols includes more lower-edge guard tones than upper-edge guard tones, determining the frequency band at block 1410 includes excluding a highest sub-band of each of one or more channels in the plurality of channels (e.g., in all channels of the plurality of channels). In either case, each "sub-band" has a bandwidth equal to the bandwidth of the frequency band being determined at block 1410 (i.e., the channel bandwidth divided by the integer n). Accordingly, the frequency band is placed within the channel such that the edge of the second PHY mode data unit having the lowest number of guard tones is not aligned with a channel edge.

At block 1412, the second data unit is caused to be transmitted via the frequency band determined at block 1410. For example, in an embodiment, a PHY processing unit within a network interface implementing the method 1400 provides the OFDM signal corresponding to the second data unit to an RF transmit chain.

Whereas FIGS. 18-24 relate to channelization based on normal mode data unit bandwidths, lower bandwidth regions (e.g., Europe, Japan, etc.) in some embodiments are channelized based on the low bandwidth mode data units. In these embodiments, the channel bandwidth equals the bandwidth of a low bandwidth mode data unit (e.g., 1 MHz), and normal mode data units (e.g., 2 MHz and greater) are transmitted in composite channels formed by aggregating the narrower channels.

In one more specific example embodiment, a dual mode device (e.g., client station 25-1 of FIG. 1), when used in a low bandwidth region, is channelized based on a 1 MHz bandwidth corresponding to 32-point IDFT signals of a low bandwidth mode PHY. In some such embodiments, 64-point IDFT (2 MHz) normal mode data units using the same clock rate are also permitted in the low bandwidth region. 2 MHz channels are formed by aggregating two or more of the 1 MHz channels, with no overlap between the various composite 2 MHz channels. In a 2 MHz basic service set (BSS) in such a region, the presence of a low bandwidth mode 1 MHz signal could be in either the lower or upper sideband of the 2 MHz composite channel, depending on which sideband corresponds to a 1 MHz primary channel in a particular scenario.

In one such embodiment and scenario, 128-point, 256-point, and 512-point IDFT signals (corresponding to 4 MHz, 8 MHz, and 16 MHz signals) are disallowed, even if the dual mode device is configured to support these wider-band normal mode signals in other regions. In other of these embodiments, 128-point, 256-point, and/or 512-point IDFT signals are allowed. Moreover, in some embodiments, the low bandwidth mode signal is allowed more MCSs than in the wider bandwidth regions. A receiver in this embodiment and scenario auto-detects whether a received data unit is a 32-point of 64-point IDFT (1 MHz or 2 MHz) signal (e.g., using an STF. LTF, and/or SIG field) based on a priori knowledge of whether the lower or upper sideband of the composite 2 MHz channel corresponds the primary 1 MHz channel. In embodiments where 128-point, 256-point, and/or 512-point IDFT signals are allowed, auto-detection of which bandwidth signal is received is based on a SIG field (e.g., an HTSIG field as in the IEEE 802.11n and IEEE 802.11ac Standards). In an embodiment, 32-point IDFT signals that correspond to a primary channel and are located in a sideband of the 2 MHz composite channel may utilize the tone re-routing techniques of FIG. 22 or 23 if needed to increase the number of guard bands at one or both edges of the 2 MHz composite channel.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method comprising:
generating a first data unit corresponding to a first physical layer (PHY) mode, wherein generating the first data unit includes
   (a) forward error correction (FEC) encoding a first plurality of information bits,
   (b) mapping the FEC-encoded first plurality of information bits to a first plurality of constellation symbols, and
   (c) generating a first plurality of orthogonal frequency division multiplexing (OFDM) symbols to include the first plurality of constellation symbols, wherein the first plurality of OFDM symbols (i) utilizes a first tone spacing, and (ii) includes a first number of non-zero tones collectively spanning a first bandwidth; and
generating a second data unit corresponding to a second PHY mode, wherein generating the second data unit includes
   (a) FEC encoding a second plurality of information bits,
   (b) block encoding the FEC-encoded second plurality of information bits,
   (c) mapping the block-encoded second plurality of information bits to a second plurality of constellation symbols, and
   (d) generating a second plurality of OFDM symbols to include the second plurality of constellation symbols, wherein
      the second plurality of OFDM symbols (i) utilizes the first tone spacing, and (ii) includes a second number of non-zero tones collectively spanning a second bandwidth,
      the second number of non-zero tones is less than the first number of non-zero tones, and
      the second bandwidth is less than the first bandwidth.

2. A method according to claim 1, wherein block encoding the FEC-encoded second plurality of information bits includes:
partitioning the second plurality of information bits into blocks of n information bits; and
repeating each block of n information bits m times to generate m*n information bits.

3. A method according to claim 2, wherein generating the second data unit further includes interleaving the m*n information bits.

4. A method according to claim 1, wherein:
the second number of non-zero tones is no more than half the first number of non-zero tones; and
the second bandwidth is no more than half the first bandwidth.

5. A method according to claim 4, wherein:
generating the first plurality of OFDM symbols includes utilizing a 64-point inverse discrete Fourier transform (IDFT); and
generating the second plurality of OFDM symbols includes either (i) utilizing a 64-point IDFT and zeroing out at least half of the resulting tones, or (ii) utilizing a 32-point IDFT.

6. A method according to claim 1, wherein:
FEC encoding the first plurality of information bits is performed according to a first modulation and coding scheme (MCS) selected from a plurality of MCSs, wherein the plurality of MCSs corresponds to a plurality of throughput levels;
mapping the FEC-encoded first plurality of information bits to the first plurality of constellation symbols is performed according to the first MCS;
FEC encoding the second plurality of information bits is performed according to a second MCS, wherein the second MCS corresponds to a throughput level lower than or equal to a lowest throughput level of the plurality of throughput levels; and
mapping the FEC-encoded second plurality of information bits to the second plurality of constellation symbols is performed according to the second MCS.

7. A method according to claim 1, wherein:
at least a portion of the first plurality of information bits corresponds to a data portion of the first data unit; and
at least a portion of the second plurality of information bits corresponds to a data portion of the second data unit.

8. A method according to claim 7, wherein:
another portion of the first plurality of information bits corresponds to a signal field of a preamble of the first data unit; and
another portion of the second plurality of information bits corresponds to a signal field of a preamble of the second data unit.

9. A method according to claim 1, wherein:
FEC encoding the first plurality of information bits includes binary convolutional coder (BCC) encoding the first plurality of information bits; and
FEC encoding the second plurality of information bits includes BCC encoding the second plurality of information bits.

10. A method according to claim 1, wherein:
FEC encoding the first plurality of information bits includes low density parity check (LDPC) encoding the first plurality of information bits; and
FEC encoding the second plurality of information bits includes LDPC encoding the second plurality of information bits.

11. A method according to claim 1, wherein the second plurality of constellation symbols is different than the first plurality of constellation symbols.

12. An apparatus comprising:
a network interface configured to
   generate a first data unit corresponding to a first physical layer (PHY) mode, wherein the network interface is configured to generate the first data unit at least in part by
      (a) forward error correction (FEC) encoding a first plurality of information bits,
      (b) mapping the FEC-encoded first plurality of information bits to a first plurality of constellation symbols, and
      (c) generating a first plurality of orthogonal frequency division multiplexing (OFDM) symbols to include the first plurality of constellation symbols, wherein the first plurality of OFDM symbols (i) utilizes a first tone spacing and (ii) includes a first number of non-zero tones collectively spanning a first bandwidth, and
   generate a second data unit corresponding to a second PHY mode, wherein the network interface is configured to generate the second data unit at least in part by
      (a) FEC encoding a second plurality of information bits,
      (b) block encoding the FEC-encoded second plurality of information bits, (c) mapping the block-encoded second plurality of information bits to a second plurality of constellation symbols, and (d) generating a second plurality of OFDM symbols to include the second plurality of constellation symbols, wherein
the second plurality of OFDM symbols (i) utilizes the first tone spacing and (ii) includes a second number of non-zero tones collectively spanning a second bandwidth,
the second number of non-zero tones is less than the first number of non-zero tones, and
the second bandwidth is less than the first bandwidth.

13. An apparatus according to claim 12, wherein the network interface is configured to block encode the FEC-encoded second plurality of information bits at least by
partitioning the second plurality of information bits into blocks of n information bits, and
repeating each block of n information bits m times to generate m*n information bits.

14. An apparatus according to claim 13, wherein the network interface is further configured to generate the second data unit by interleaving the m*n information bits.

15. An apparatus according to claim 12, wherein:
the second number of non-zero tones is no more than half the first number of non-zero tones; and
the second bandwidth is no more than half the first bandwidth.

16. An apparatus according to claim 15, wherein the network interface is configured to
generate the first plurality of OFDM symbols at least by utilizing a 64-point inverse discrete Fourier transform (IDFT), and
generate the second plurality of OFDM symbols includes at least by either (i) utilizing a 64-point IDFT and zeroing out at least half of the resulting tones, or (ii) utilizing a 32-point IDFT.

17. An apparatus according to claim 12, wherein the network interface is configured to
FEC encode the first plurality of information bits according to a first modulation and coding scheme (MCS) selected from a plurality of MCSs, wherein the plurality of MCSs corresponds to a plurality of throughput levels,
map the FEC-encoded first plurality of information bits to the first plurality of constellation symbols according to the first MCS,
FEC encode the second plurality of information bits according to a second MCS, wherein the second MCS corresponds to a throughput level equal to or less than a lowest throughput level of the plurality of throughput levels, and
map the FEC-encoded second plurality of information bits to the second plurality of constellation symbols according to the second MCS.

18. An apparatus according to claim 12, wherein
at least a portion of the first plurality of information bits corresponds to a data portion of the first data unit, and
at least a portion of the second plurality of information bits corresponds to a data portion of the second data unit.

19. An apparatus according to claim 18, wherein
another portion of the first plurality of information bits corresponds to a signal field of a preamble of the first data unit, and
another portion of the second plurality of information bits corresponds to a signal field of a preamble of the second data unit.

20. An apparatus according to claim 12, wherein the network interface is configured to
FEC encode the first plurality of information bits at least by binary convolutional coder (BCC) encoding the first plurality of information bits, and
FEC encode the second plurality of information bits at least by BCC encoding the second plurality of information bits.

21. An apparatus according to claim 12, wherein the network interface is configured to
FEC encode the first plurality of information bits at least by low density parity check (LDPC) encoding the first plurality of information bits, and
FEC encode the second plurality of information bits at least by LDPC encoding the second plurality of information bits.

22. An apparatus according to claim 12, wherein the second plurality of constellation symbols is different than the first plurality of constellation symbols.

23. A method comprising:
generating a first data unit corresponding to a first physical layer (PHY) mode, wherein generating the first data unit includes
(a) forward error correction (FEC) encoding a first plurality of information bits according to a first modulation and coding scheme (MCS) selected from a plurality of MCSs, wherein
the plurality of MCSs corresponds to a plurality of throughput levels,
a portion of the first plurality of information bits corresponds to a data portion of the first data unit, and
another portion of the first plurality of information bits corresponds to a signal field of a preamble of the first data unit,
(b) mapping the FEC-encoded first plurality of information bits to a first plurality of constellation symbols according to the first MCS, and
(c) generating a first plurality of orthogonal frequency division multiplexing (OFDM) symbols to include the first plurality of constellation symbols, wherein the first plurality of OFDM symbols (i) utilizes a first tone spacing and (ii) includes a first number of non-zero tones collectively spanning a first bandwidth; and generating a second data unit corresponding to a second PHY mode, wherein generating the second data unit includes
(a) FEC encoding a second plurality of information bits according to a second MCS, wherein
the second MCS corresponds to a throughput level equal to or less than a lowest throughput level of the plurality of throughput levels,
a portion of the second plurality of information bits corresponds to a data portion of the second data unit, and
another portion of the second plurality of information bits corresponds to a signal field of a preamble of the second data unit,
(b) partitioning the FEC-encoded second plurality of information bits into blocks of n information bits,
(c) repeating each block of n information bits two times to generate 2*n information bits,
(d) mapping the partitioned and repeated second plurality of information bits to a second plurality of constellation symbols according to the second MCS, and (e) generating a second plurality of OFDM symbols to include the second plurality of constellation symbols, wherein
the second plurality of OFDM symbols (i) utilizes the first tone spacing and (ii) includes a second number of non-zero tones collectively spanning a second bandwidth,
the second number of non-zero tones is no more than half the first number of non-zero tones, and
the second bandwidth is no more than half the first bandwidth.

24. A method according to claim 23, wherein:
generating the first plurality of OFDM symbols includes utilizing a 64-point inverse discrete Fourier transform (IDFT); and
generating the second plurality of OFDM symbols includes either (i) utilizing a 64-point IDFT and zeroing out at least half of the resulting tones, or (ii) utilizing a 32-point IDFT.

25. A method according to claim 23, wherein:
FEC encoding the first plurality of information bits includes binary convolutional coder (BCC) encoding the first plurality of information bits; and
FEC encoding the second plurality of information bits includes BCC encoding the second plurality of information bits.

26. An apparatus comprising:
a network interface configured to
generate a first data unit corresponding to a first physical layer (PHY) mode, wherein the network interface is configured to generate the first data unit at least in part by
(a) forward error correction (FEC) encoding a first plurality of information bits according to a first modulation and coding scheme (MCS) selected from a plurality of MCSs, wherein
the plurality of MCSs corresponds to a plurality of throughput levels,
a portion of the first plurality of information bits corresponds to a data portion of the first data unit, and
another portion of the first plurality of information bits corresponds to a signal field of a preamble of the first data unit,
(b) mapping the FEC-encoded first plurality of information bits to a first plurality of constellation symbols according to the first MCS, and
(c) generating a first plurality of orthogonal frequency division multiplexing (OFDM) symbols to include the first plurality of constellation symbols, wherein the first plurality of OFDM symbols (i) utilizes a first tone spacing and (ii) includes a first number of non-zero tones collectively spanning a first bandwidth, and
generate a second data unit corresponding to a second PHY mode, wherein the network interface is configured to generate the second data unit at least in part by
(a) FEC encoding a second plurality of information bits according to a second MCS, wherein
the second MCS corresponds to a throughput level equal to or less than a lowest throughput level of the plurality of throughput levels,
a portion of the second plurality of information bits corresponds to a data portion of the second data unit, and
another portion of the second plurality of information bits corresponds to a signal field of a preamble of the second data unit,
(b) partitioning the FEC-encoded second plurality of information bits into blocks of n information bits,
(c) repeating each block of n information bits two times to generate 2*n information bits,
(d) mapping the partitioned and repeated second plurality of information bits to a second plurality of constellation symbols according to the second MCS, and
(e) generating a second plurality of OFDM symbols to include the second plurality of constellation symbols, wherein
the second plurality of OFDM symbols (i) utilizes the first tone spacing and (ii) includes a second number of non-zero tones collectively spanning a second bandwidth,
the second number of non-zero tones is no more than half the first number of non-zero tones, and
the second bandwidth is no more than half the first bandwidth.

27. An apparatus according to claim 26, wherein the network interface is configured to
generate the first plurality of OFDM symbols at least by utilizing a 64-point inverse discrete Fourier transform (IDFT), and
generate the second plurality of OFDM symbols at least by either (i) utilizing a 64-point IDFT and zeroing out at least half of the resulting tones, or (ii) utilizing a 32-point IDFT.

28. An apparatus according to claim 26, wherein the network interface is configured to
FEC encode the first plurality of information bits at least by binary convolutional coder (BCC) encoding the first plurality of information bits, and
FEC encoding the second plurality of information bits at least by BCC encoding the second plurality of information bits.

* * * * *